(12) United States Patent  
Negri Jimenez et al.

(10) Patent No.: US 12,428,579 B2  
(45) Date of Patent: Sep. 30, 2025

(54) THREE-DIMENSIONAL PRINTING

(71) Applicant: PERIDOT PRINT LLC, Palo Alto, CA (US)

(72) Inventors: Graciela E Negri Jimenez, San Diego, CA (US); Shannon Reuben Woodruff, San Diego, CA (US); Emre Hiro Discekici, San Diego, CA (US); Jason C Butler, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 234 days.

(21) Appl. No.: 17/996,630

(22) PCT Filed: Apr. 24, 2020

(86) PCT No.: PCT/US2020/029845  
§ 371 (c)(1),  
(2) Date: Oct. 20, 2022

(87) PCT Pub. No.: WO2021/216087  
PCT Pub. Date: Oct. 28, 2021

(65) Prior Publication Data  
US 2023/0227692 A1    Jul. 20, 2023

(51) Int. Cl.  
*C09D 177/02* (2006.01)  
*B29C 64/165* (2017.01)  
(Continued)

(52) U.S. Cl.  
CPC .......... *C09D 177/02* (2013.01); *B29C 64/165* (2017.08); *B33Y 10/00* (2014.12);  
(Continued)

(58) Field of Classification Search  
CPC .......................... C09D 177/02; B29C 64/165; B29K 2077/00; B29K 2105/0044; C08K 5/134;  
(Continued)

(56) References Cited

U.S. PATENT DOCUMENTS

| 5,389,219 A * | 2/1995 | Zwack | B05D 7/142 |
| | | | 427/407.1 |
| 8,110,532 B2 * | 2/2012 | Dong | C10M 161/00 |
| | | | 508/185 |

(Continued)

FOREIGN PATENT DOCUMENTS

| CN | 107880531 A | 4/2018 | |
| CN | 110591348 A * | 12/2019 | ............ C08F 212/08 |

(Continued)

OTHER PUBLICATIONS

CN 108794897 A (Year: 2018).*

(Continued)

*Primary Examiner* — Joseph D Anthony  
(74) *Attorney, Agent, or Firm* — Dierker & Kavanaugh, P.C.

(57) ABSTRACT

An example of a jettable antioxidant formulation is for three-dimensional (3D) printing. The jettable antioxidant formulation includes an antioxidant blend; a surfactant, a dispersant, or a combination thereof; a water soluble or water miscible organic co-solvent; and water. The antioxidant blend consists of a primary antioxidant and a secondary antioxidant.

13 Claims, 7 Drawing Sheets

(51) Int. Cl.
  *B33Y 10/00* (2015.01)
  *B33Y 70/00* (2020.01)
  *C08K 5/134* (2006.01)
  *C08K 5/372* (2006.01)
  *B29K 77/00* (2006.01)
  *B29K 105/00* (2006.01)

(52) U.S. Cl.
  CPC .......... *B33Y 70/00* (2014.12); *B29K 2077/00* (2013.01); *B29K 2105/0044* (2013.01); *C08K 5/134* (2013.01); *C08K 5/372* (2013.01); *C08K 2201/005* (2013.01); *C08K 2201/012* (2013.01)

(58) Field of Classification Search
  CPC .............. C08K 5/372; C08K 2201/005; C08K 2201/012
  See application file for complete search history.

(56) References Cited

U.S. PATENT DOCUMENTS

| | | | | |
|---|---|---|---|---|
| 2005/0170978 A1* | 8/2005 | Migdal | ................ | C10M 141/08 508/497 |
| 2010/0130396 A1* | 5/2010 | Dong | ................... | C10M 141/06 524/186 |
| 2015/0335574 A1* | 11/2015 | Nicolosi | ................... | A61P 3/06 424/489 |
| 2017/0260354 A1* | 9/2017 | Smetana | .............. | C08K 5/0008 |
| 2019/0144692 A1 | 5/2019 | Naito et al. | | |
| 2020/0115574 A1* | 4/2020 | Querol Esparch | ...... | C08L 23/12 |

FOREIGN PATENT DOCUMENTS

| | | |
|---|---|---|
| WO | 2014/096951 A2 | 6/2014 |
| WO | 2017/059866 A2 | 4/2017 |
| WO | 2017/110744 A1 | 6/2017 |
| WO | 2018/106237 A1 | 6/2018 |
| WO | 2019/018340 A1 | 1/2019 |
| WO | 2019/108200 A1 | 6/2019 |
| WO | 2019/182577 A1 | 9/2019 |
| WO | 2019/182579 A1 | 9/2019 |
| WO | 2020/046268 A1 | 3/2020 |
| WO | 2021/141587 A1 | 7/2021 |
| WO | 2021/194462 A1 | 9/2021 |

OTHER PUBLICATIONS

CN 110272563 A (Year: 2019).*
CN 110734637 A (Year: 2020).*
CN 1109821183 A (Year: 2020).*
BASF, Industrial Coatings Technical Data Sheet for Irganox 245, Apr. 2015, retrieved from <https://dispersions-resins-products.basf.us/files/technical-datasheets/Irganox_245_April_2015_R2_IC.pdf>, 3 pages.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
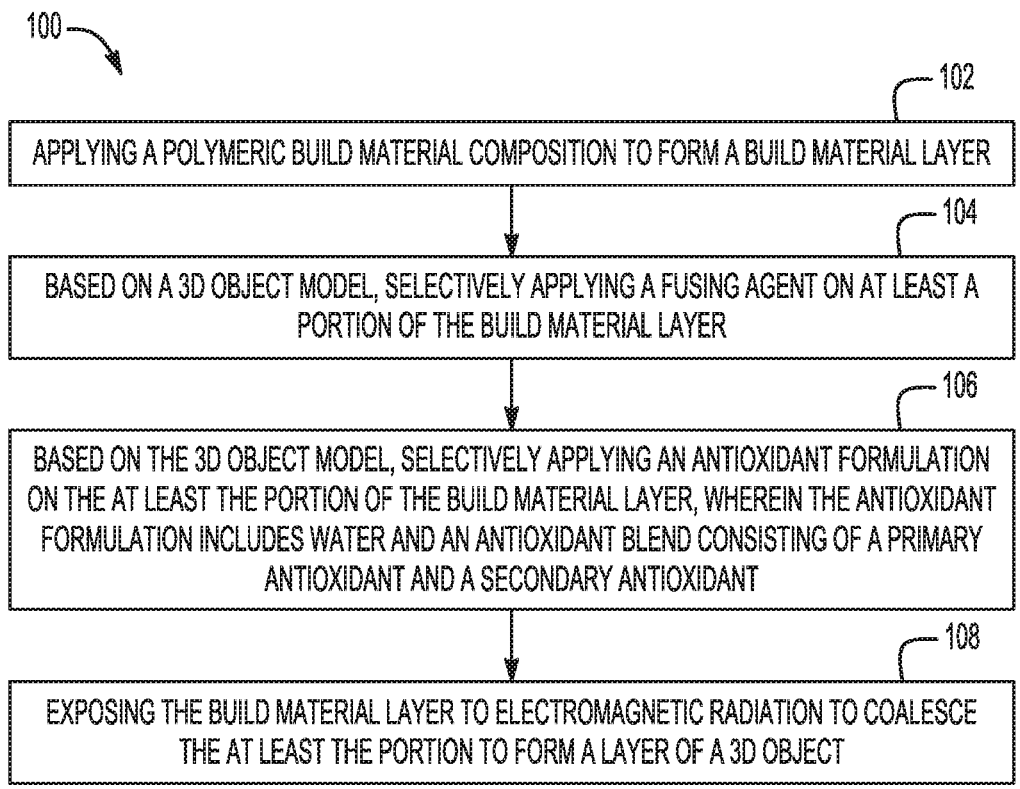
FIG. 1 is a flow diagram depicting an example of a 3D printing method.

Some examples of three-dimensional (3D) printing may utilize a fusing agent (including an electromagnetic radiation absorber) to pattern polymeric build material. In these examples, an entire layer of the polymeric build material is exposed to electromagnetic radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D part.

These examples of three-dimensional (3D) printing may also include a pre-heating process, where the entire layer of the polymeric build material is heated (e.g., to a temperature ranging from about 5° C. to about 50° C. below the melting point or melting range of the polymeric build material) prior to electromagnetic radiation exposure. Pre-heating elevates the build material temperature, and thus reduces the amount of thermal energy it takes to elevate the polymeric build material above its melting point during subsequent processing (as compared to the amount of thermal energy that it takes to elevate the polymeric build material when is not pre-heated).

Throughout the full printing cycle (i.e., patterning and fusing), the polymeric build material may be exposed to high temperatures for a prolonged periods. Moreover, the high temperature exposure may take place in an air environment (i.e., an environment containing 20 vol % or more oxygen) or another oxygen-containing environment. Prolonged exposure to high temperatures in an oxygen-containing environment may result in the thermal degradation of the polymeric build material. For example, exposure to high temperatures in an oxygen-containing environment may result in chain scission at the amide functionality of a polyamide build material. Thermal degradation may cause discoloration (e.g., yellowing or browning) of and/or may reduce the quality of the 3D object. Thermal degradation may also cause discoloration of the non-patterned polymeric build material and thus may reduce the reusability/recyclability of the non-patterned polymeric build material.

An antioxidant formulation is disclosed herein which can be used throughout the 3D printing process. The antioxidant formulation is jettable, which enables controlled (and potentially varying) application of the formulation at the voxel level. The ability to jet the antioxidant formulation during the 3D print process may help to stabilize the polymeric build material as printing is performed, and thus may reduce the discoloration and improve the quality of 3D printed objects, and/or may reduce the discoloration and improve the reusability/recyclability of the non-patterned polymeric build material.

Throughout this disclosure, a weight percentage that is referred to as "wt % active" refers to the loading of an active component of a dispersion or other formulation that is present, e.g., in the antioxidant formulation, fusing agent, detailing agent, etc. For example, an energy absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the antioxidant formulation, fusing agent, etc.) of a 100% active component that does not include other non-active components therein, or ii) the loading (in the antioxidant formulation, fusing agent, etc.) of a material or component that is used "as is" and thus the wt % accounts for both active and non-active components.

3D Printing Multi-Fluid Kits and 3D Printing Kits

The examples disclosed herein include multi-fluid kits for 3D printing and 3D printing kits.

An example of a multi-fluid kit for 3D printing includes a fusing agent including water and an electromagnetic radiation absorber; and an antioxidant formulation including water and an antioxidant blend consisting of a primary antioxidant and a secondary antioxidant. Some examples of the multi-fluid kit further comprise a coloring agent selected from the group consisting of a black ink, a cyan ink, a magenta ink, or a yellow ink; or a detailing agent including a surfactant, a co-solvent, and water; or both the coloring agent and the detailing agent.

Any example of the multi-fluid kit may also be part of a 3D printing kit. In addition to the fluids of the multi-fluid kit, the 3D printing kit also includes a polymeric build material composition.

It is to be understood that the fluids of the multi-fluid kits or fluids and composition of the 3D printing kits may be maintained separately until used together in examples of the 3D printing method disclosed herein. The fluids and/or compositions may each be contained in one or more containers prior to and during printing, but may be combined together during printing. The containers can be any type of a vessel (e.g., a reservoir), box, or receptacle made of any material.

As used herein, it is to be understood that the terms "set" or "kit" may, in some instances, be synonymous with "composition."

As mentioned, various fluids and/or composition(s) may be included in the fluid kits and/or 3D printing kits disclosed herein. Example compositions of the antioxidant formulation, the fusing agent, the detailing agent, the coloring agent, and the build material composition will now be described.

Antioxidant Formulation

The antioxidant formulation includes an antioxidant blend consisting of a primary antioxidant and a secondary antioxidant; a surfactant, a dispersant, or a combination thereof; a water soluble or water miscible organic co-solvent; and water. In some examples, the antioxidant formulation consists of these components. In other examples, the antioxidant formulation may include other additives, such as a buffer.

The antioxidant formulation may be prepared by first making a dispersion of the primary antioxidant and the secondary antioxidant, and then combining the dispersion with the other liquid components (e.g., co-solvent, water, etc.).

The antioxidant dispersion includes the primary antioxidant; the secondary antioxidant; a surfactant, a dispersant, or a combination thereof; and water.

The primary antioxidant is a radical scavenger, which acts as a hydrogen atom or electron donor to quench polymer radicals (reactive free radicals, such as carbon-centered and peroxy radicals). Quenching radicals of the polymeric build material disrupts their ability to continue free radical chain propagation process, and thus stabilizes the polymeric build material.

In an example, the primary antioxidant may be a hindered phenol, e.g., a bis hindered phenol. Examples of suitable bis hindered phenols include IRGANOX®245 (ethylene bis (oxyethylene) bis-(3-(5-tert-butyl-4-hydroxy-m-tolyl)-propionate), having the structure:

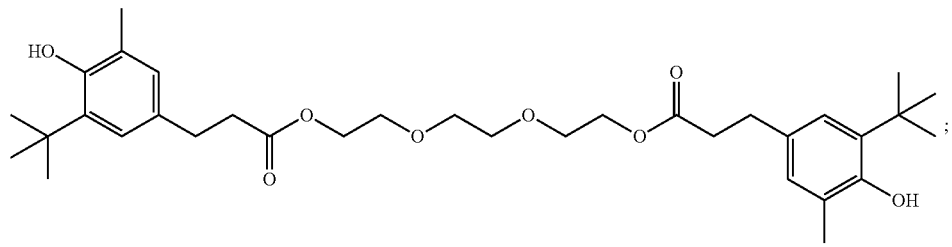 [SMILES: Cc1cc(CCC(=O)OCCOCCOCCOC(=O)CCc2cc(C)c(O)c(C(C)(C)C)c2)cc(C(C)(C)C)c1O]

IRGANOX® 1098 (benzenepropanamide, N, N'-1,6-hexanediylbis(3,5-bis(1,1-dimethylethyl)-4-hydroxy));
IRGANOX®254 (a mixture of 40% triethylene glycol bis (3-tert-butyl-4-hydroxy-5-methylphenyl), polyvinyl alcohol and deionized water); and 2,2'-methylenebis(6-tert-butyl-4-methylphenol).

The secondary antioxidant reacts with an intermediate degradation product of the polymer radicals and molecular oxygen (e.g., a hydroperoxide) to stabilize the polymeric build material. For example, the secondary antioxidant is a peroxide scavenger. Peroxides are susceptible to decomposing into free radicals that can further oxidize the polymeric build material. Secondary antioxidants can prevent this degradation pathway by reacting with and decomposing the peroxides into nonreactive products before they decompose into alkoxy and hydroxyl radicals.

Various examples of secondary antioxidants can include thioethers, thioesters, and phosphites.

In an example, the thioether may be a dilauryl ester of 3,3'-thiodipropionic acid, which is also known as dilauryl thiodipropionate (DLTDP). DLTDP is also sometimes characterized as a thioester. Dilauryl thiodipropionate has the chemical formula:

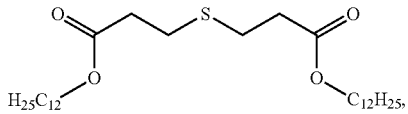

and is commercially available from Struktol Company of America under the tradename CARSTAB® DLTDP. In another example, the thioether may be dioctadecyl 3,3'-thiodipropionate (DSTDP). Dioctadecyl 3,3'-thiodipropionate has the chemical formula:

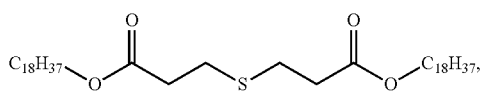

and is commercially available from Struktol Company of America under the tradename CARSTAB® DSTDP. Still other examples of thioethers includes pentaerythritol tetrakis (beta-laurylthiopropionate) and thiobis[2-(1,1-dimethylethyl)-5-methyl-4,1-phenylene]bis[3-(dodecylthio)prop]onate. While some thioether examples have been provided, it is believed that other thioesters or thioethers may be used.

Examples of suitable inorganic phosphites include tris(2, 4-ditert-butylphenyl) phosphite, 3,9-bis(octadecyloxy)-2,4, 8,10-tetraoxa-3,9-diphosphaspiro[5.5]undecane, or a combination thereof. One commercially available example includes BRUGGOLEN® H10 (an inorganic phosphite available from Brüggemann Chemical).

The primary and secondary antioxidants together make up the antioxidant blend. In one example of the antioxidant blend, the primary antioxidant is a hindered phenol; and the secondary antioxidant is selected from the group consisting of a thioether, a thioester, a phosphite, and a combination thereof.

Without being bound to any theory, it is believed that the antioxidant blend exhibits a synergistic effect that contributed to the reduction in degradation of the polymeric build material. In particular, the hydrogen bonding between a hydroxyl group of the primary antioxidant and an oxygen of the secondary antioxidant may contribute to the synergistic effect of the antioxidant blend. The hydrogen bonding may ensure that the functional group(s) of the secondary antioxidant is within proximity as the functional group(s) of the primary antioxidant complete its function.

In the antioxidant formulation, it is desirable for the antioxidant blend (i.e., both the primary and secondary antioxidants) to be present in an amount ranging from about 1 wt % active to about 15 wt % active of a total weight of the antioxidant formulation. In some examples, the antioxidant blend is present in the antioxidant formulation in an amount ranging from about 2 wt % active to about 10 wt % active of a total weight of the antioxidant formulation. In still other examples, the antioxidant blend is present in the antioxidant formulation in an amount ranging from about 2 wt % active to about 5 wt % active, or from about 3 wt % active to about 4 wt % active of a total weight of the antioxidant formulation.

The desired amount of the antioxidant blend in the final antioxidant formulation will dictate, in part, the amount of each of the primary and secondary antioxidants used in the dispersion. When preparing the dispersion of the primary antioxidant and the secondary antioxidant, the respective amounts of the primary and secondary antioxidants used will depend, at least in part, upon how much of the dispersion is to be included in the antioxidant formulation and the active percentage of the raw antioxidant materials. In the dispersion, the antioxidant blend (i.e., both the primary and secondary antioxidants) may be present in an amount ranging from about 5 wt % active to about 30 wt % active of a total weight of the dispersion.

In both the dispersion and the final antioxidant formulation, it is desirable for the primary antioxidant and the secondary antioxidant to be present in a weight ratio ranging from about 1:1 to about 1:5. In some instances, it may be desirable for the secondary antioxidant to be used in excess of the primary antioxidant, and thus the weight ratio of the primary antioxidant to the secondary antioxidant ranges from about 1:2 to about 1:5, or from about 1:1.5 to about 1:4, or from about 1:2 to about 1:3, etc.

The dispersion includes the primary and secondary antioxidants in water. Many secondary antioxidants may not be miscible with water. Therefore, a surfactant, dispersant, or combination thereof may be included in the dispersion to aid in dispersing the secondary antioxidant.

The surfactant may be any anionic, cationic, or non-ionic surfactant that can adequately disperse the antioxidants in water. In one example, the surfactant included in the dispersion is sodium stearate, stearyl alcohol, or a combination thereof. These surfactants may also aid in dispersability.

The dispersant may be selected from the group consisting of styrene acrylic copolymers, poly(vinyl alcohol), a vinyl alcohol copolymer, and combinations thereof. Some specific examples of suitable dispersants include water-soluble styrene-acrylic acid copolymers/resins, such as, e.g., JONCRYL®296, JONCRYL®671, JONCRYL®678, JONCRYL®680, JONCRYL®683, JONCRYL®690, etc. available from BASF Corp., and poly(vinyl alcohol)s, such as those in the MOWIOL® series available from Kuraray Europe GmbH. Examples of suitable vinyl alcohol copolymers include Poly(vinyl alcohol-co-ethylene) (e.g., with ethylene at 27 mol % or 32 mol %).

In one example, the dispersion (and thus the final formulation) includes both the surfactant and the dispersant; the surfactant is a mixture of stearyl alcohol and sodium stearate; and the dispersant is selected from the group consisting of styrene acrylic, poly(vinyl alcohol), a vinyl alcohol copolymer, and combinations thereof.

Whether a surfactant or a dispersant is used singly or in combination, the total amount of surfactant(s) and/or dispersant(s) may range from about 0.01 wt % to about 10 wt % based on a total weight of the dispersion. In some specific examples, the surfactant(s) and/or dispersant(s) may range from about 0.5 wt % to about 5 wt %, or from about 0.1 wt % to about 2 wt %, based on a total weight of the dispersion.

In an example of a method for making the dispersion, the primary and secondary antioxidants are combined with the surfactant and/or dispersant and melted. The primary and secondary antioxidants can have relatively low melting points so that the antioxidants can be melted. The melted antioxidants can then be emulsified in water. In certain examples, each antioxidant has a melting point ranging from about 30° C. to about 150° C. In other examples, each antioxidant has a melting point ranging from about 40° C. to about 120° C., or from about 50° C. to about 100° C. The temperature for melting will depend upon the antioxidants used, but in an example, ranges from about 100° C. to about 150° C.

The melted mixture can then be cooled, e.g., to a temperature ranging from about 60° C. to about 80° C.

The mixture may also be stirred throughout melting and cooling.

Water and a basic aqueous solution may then be added to the cooled mixture to form a relatively viscous, yet stirrable paste. Any basic aqueous solution may be used, including a potassium hydroxide (KOH) solution, a sodium hydroxide (NaOH) solution, or the like. The concentration of the basic aqueous solution may range from about 10% to about 60%. In some examples, the concentration of the basic aqueous solution may range from about 20% to about 50%, or from about 40% to about 60%. In one example, the basic aqueous solution is a 50% KOH solution. The basic aqueous solution may be added in an amount ranging from about 0.01 wt % active to about 0.5 wt % active, based on a total weight of the dispersion.

Additional water may then be added to form an emulsion of the melted antioxidants. The emulsion can then be cooled to form a dispersion of solid antioxidant blend particles.

While example emulsification conditions have been described, it is to be understood that the conditions may vary depending upon the primary and secondary antioxidants that are used.

The particle size of the antioxidant blend particles in the dispersion can be reduced by milling. It may be desirable to reduce the particle size of the antioxidant blend particles so that they are small enough to be easily jettable (e.g., using a thermal inkjet printhead or a piezoelectric inkjet printhead). As an example, the particles can have an average particle size ranging from about 10 nm to about 800 nm. In other examples, the antioxidant blend particles can have an average particle size ranging from about 10 nm to about 500 nm, or from about 20 nm to about 100 nm. The particle size of the antioxidant blend particles can be reduced by grinding or milling, for example. The term "average particle size", as used herein, may refer to a number-weighted mean diameter or a volume-weighted mean diameter of a particle distribution.

The dispersion is then combined with other liquid components to form the antioxidant formulation. These other liquid components may include additional water, a water soluble or water miscible organic co-solvent (e.g., selected to aid in jettability), and in some instances, a surfactant and/or a buffer.

Classes of water soluble or water miscible organic co-solvents that may be used include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,2-propanediol, 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-2-pyrrolidone, and the like. Other examples of organic co-solvents include dimethyl sulfoxide (DMSO), isopropyl alcohol, ethanol, pentanol, acetone, or the like.

The co-solvent(s) may be present in the antioxidant formulation in a total amount ranging from about 1 wt % to about 20 wt % based upon the total weight of the antioxidant formulation. In an example, the antioxidant formulation includes from about 2 wt % to about 15 wt %, or from about 5 wt % to about 10 wt % of the co-solvent(s).

Suitable surfactant(s) for the antioxidant formulation include non-ionic, anionic, or cationic surfactants. Some example surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, fluorosurfactants, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), an ethoxylated low-foam wetting agent (e.g., SURFYNOL®440 or SURFYNOL® CT-111 from Evonik Degussa), an ethoxylated wetting agent and molecular defoamer (e.g., SURFYNOL®420 from Evonik Degussa), non-ionic wetting agents and molecular defoamers (e.g., SURFYNOL® 104E from Evonik Degussa), and/or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (organic surfactant) available from Evonik Degussa). Yet another suitable (anionic) surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the antioxidant formulation may range from about 0.01 wt % active to about 3 wt % active based on the total weight of the antioxidant formulation. In an example, the total amount of surfactant(s) in the antioxidant formulation may be about 0.07 wt % active based on the total weight of the antioxidant formulation.

The antioxidant formulation may also include a buffer to prevent undesirable changes in the pH. In an example, the pH of the antioxidant formulation may range from about 6 to about 10. In another example, the pH of the antioxidant formulation may range from about 6.5 to about 9.5. Examples of buffers include TRIS (tris(hydroxymethyl) aminomethane or TRIZMA®), TRIS or TRIZMA® hydrochloride, bis-tris propane, TES (2-[[2-Hydroxy-1,1-bis(hydroxymethyl)ethyl]amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl) methyl-4-aminobutanesulfonic acid), or the like.

Whether a buffer is used or a combination of buffers is used, the total amount of buffer(s) in the antioxidant formulation may range from greater than 0 wt % active to about 1 wt % active based on the total weight of the antioxidant formulation. In another example, the buffer is present in other amounts, e.g., ranging from about 0.25 wt % active to about 0.75 wt % based on the total weight of the antioxidant formulation. In an example, the buffer(s) is/are present in the antioxidant formulation in an amount of about 0.5 wt % active (based on the total weight of the antioxidant formulation).

The antioxidant formulation can also include ingredients to improve the jettability by an applicator, such as an inkjet printhead. In some examples, the antioxidant formulation can include jettability imparting ingredients such as those in the fusing agent described above. These ingredients can include antimicrobial agent(s), viscosity modifier(s), sequestering or chelating agent(s), etc. These ingredients can be included in any of the amounts described above in the fusing agent.

Fusing Agent

The fluid kit(s) and/or 3D printing kit(s) disclosed herein include one or more fusing agents.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber (or active material) in the core fusing agent may also absorb energy in the infrared region (e.g., 800 nm to 4000 nm). This absorption generates heat suitable for coalescing/fusing the build material composition in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions).

Other examples of the fusing agent include an energy absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while enabling the 3D objects (or 3D objects regions) to be white or slightly colored.

Still other examples of the energy absorber absorb at least some of the wavelengths within the range of 400 nm to 4000 nm. Examples include glass fibers, titanium dioxide, clay, mica, talc, barium sulfate, calcium carbonate, phosphate pigments, silicate pigments, and/or natural filler materials, such as nano-cellulose. These energy absorbers are often white or lightly colored and may be used in either the core fusing agent or the primer fusing agent.

Phosphates may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusing Agent

In some examples, the fusing agent is a core fusing agent and the electromagnetic radiation absorber has absorption at least at wavelengths ranging from 400 nm to 780 nm. Some examples of the core fusing agent are dispersions including the electromagnetic radiation absorber (i.e., an active material). In some examples, the active material may be an infrared light absorbing colorant. In an example, the active material is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

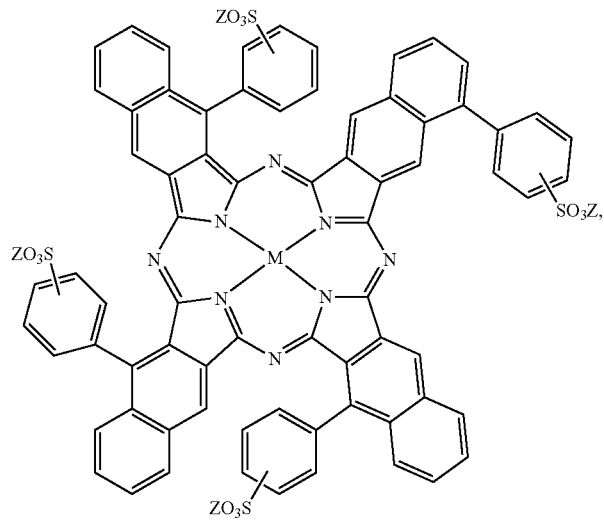

-continued
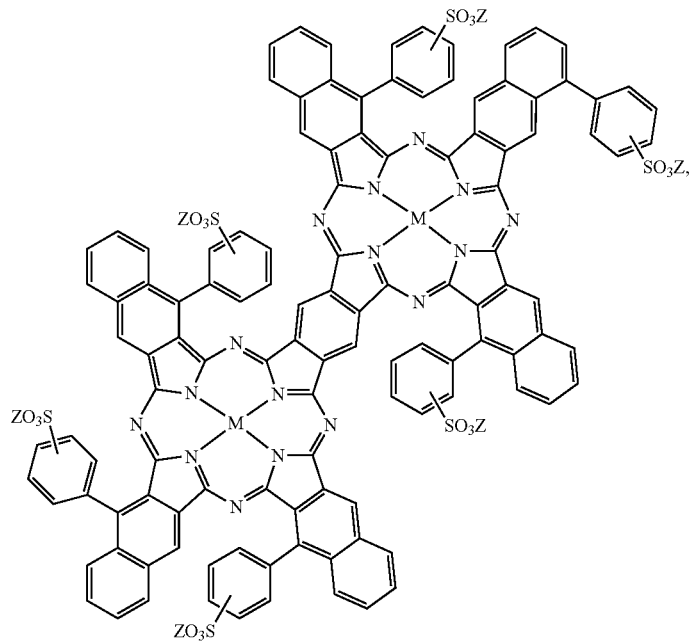
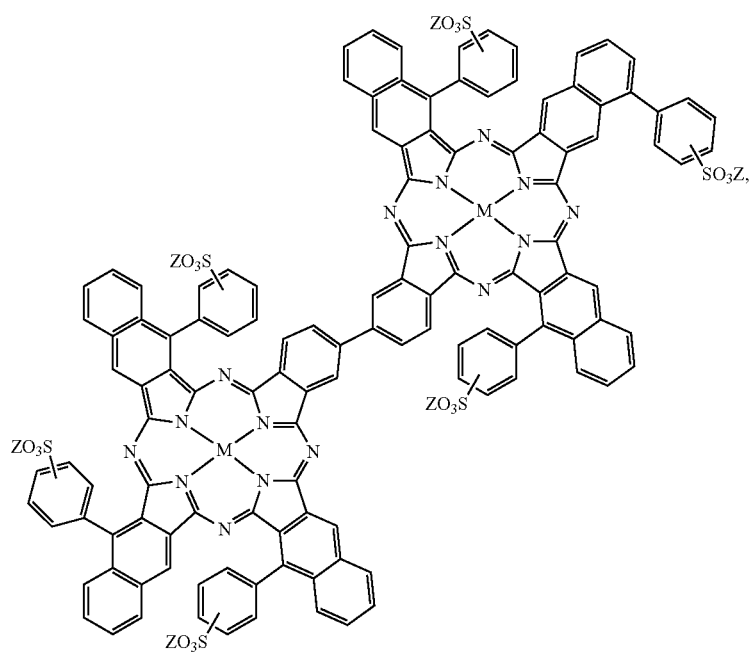

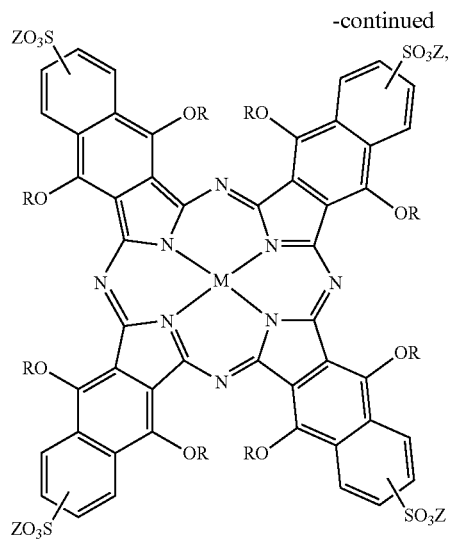

-continued and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

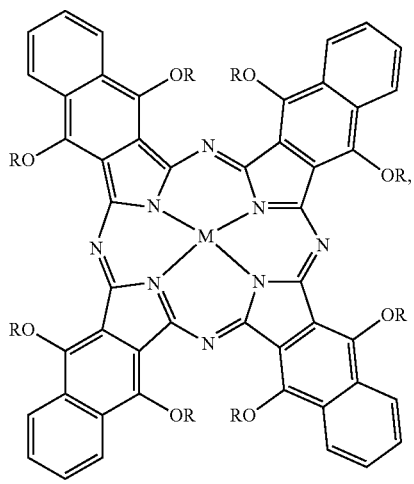

-continued

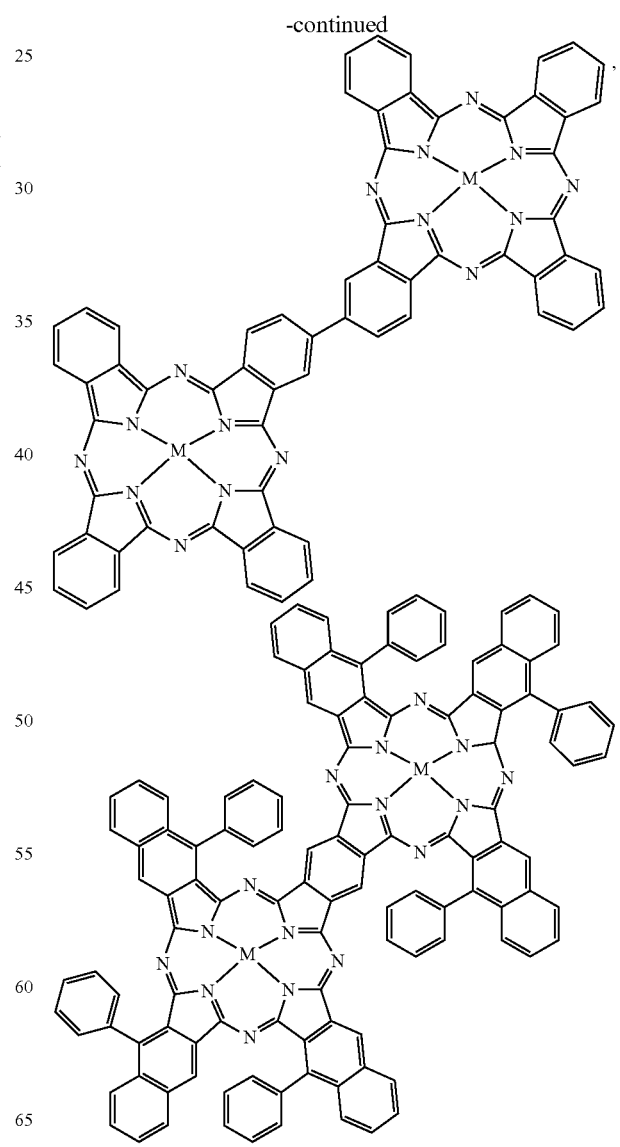

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

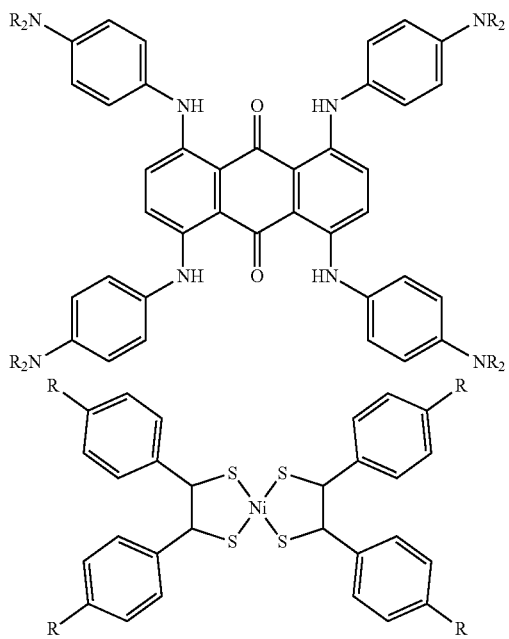

where R in the anthraquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

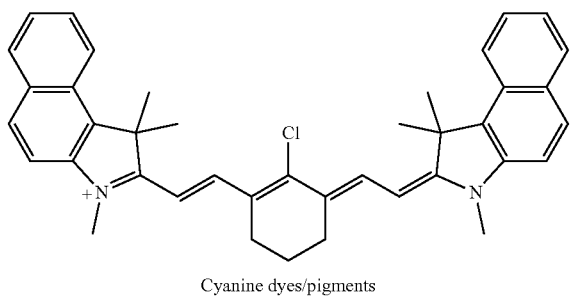

Cyanine dyes/pigments

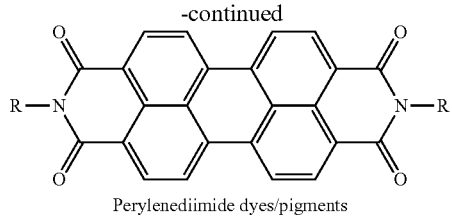

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

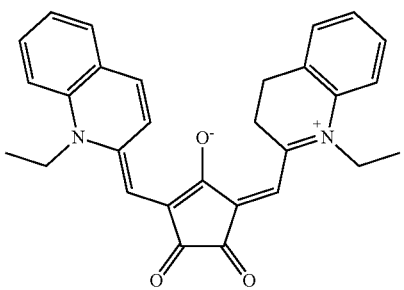

Croconium dyes/pigments

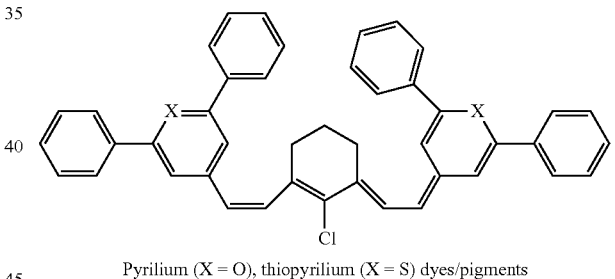

Pyrilium (X = O), thiopyrilium (X = S) dyes/pigments

Boron-dipyrromethene dyes or pigments and aza-boron-dipyrromethene dyes or pigments may have the following structures, respectively:

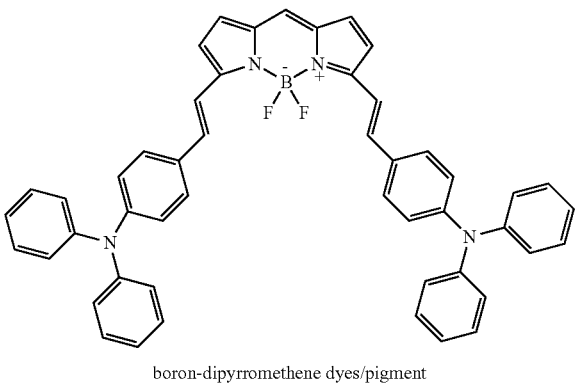

boron-dipyrromethene dyes/pigment

-continued

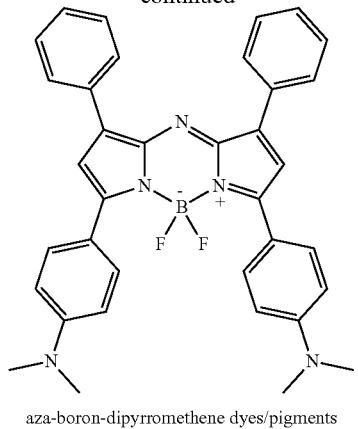

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

The amount of the energy absorber/active material that is present in the core fusing agent ranges from greater than 0 wt % active to about 40 wt % active based on the total weight of the core fusing agent. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent having jetting reliability and heat and/or radiation absorbance efficiency.

Primer Fusing Agent

In some examples, the fusing agent is a primer fusing agent and the electromagnetic radiation absorber is a plasmonic resonance absorber having absorption at wavelengths ranging from 800 nm to 4000 nm and transparency at wavelengths ranging from 400 nm to 780 nm. As such, the absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent ranges from greater than 0 wt % active to about 40 wt % active based on the total weight of the primer fusing agent. In other examples, the amount of the energy absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the primer fusing agent having jetting reliability and heat and/or radiation absorbance efficiency.

The energy absorber of the primer fusing agent may, in some instances, be dispersed with a dispersant. As such, the dispersant helps to uniformly distribute the energy absorber throughout the primer fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL®296, JONCRYL®671, JONCRYL®678, JONCRYL®680, JONCRYL®683, JONCRYL®690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used in the fusing agent, the total amount of dispersant(s) in the primer fusing agent may range from about 10 wt % to about 200 wt % based on the weight of the energy absorber in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the energy absorber in the primer fusing agent. In an example, the total amount of silane coupling agent(s) in the primer fusing agent ranges from about 1 wt % to about 30 wt % based on the weight of the energy absorber. In another example, the total amount of silane coupling agent(s) in the primer fusing agent ranges from about 2.5 wt % to about 25 wt % based on the weight of the energy absorber.

One example of the primer fusing agent includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent) includes a liquid vehicle. The fusing agent vehicle, or "FA vehicle," may refer to the liquid in which the energy absorber is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), surfactant(s), antimicrobial agent(s), anti-kogation agent(s), chelating agent(s), and/or humectant(s).

It is to be understood that any of the co-solvent(s) and/or surfactant(s) described herein for the antioxidant formulation may be used in any examples of the fusing agent in any of the amounts provided, except that the percentages will be with respect to the total weight of the fusing agent.

The FA vehicle may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (The Dow Chemical Company), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof.

In an example, the total amount of antimicrobial agent(s) in the fusing agent ranges from about 0.01 wt % active to about 0.05 wt % active (based on the total weight of the fusing agent). In another example, the total amount of antimicrobial agent(s) in the fusing agent is about 0.04 wt % active (based on the total weight of the fusing agent).

The FA vehicle may also include anti-kogation agent(s) that is/are to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation.

Examples of suitable anti-kogation agents include oleth-3-phosphate (commercially available as CRODAFOS™

03A or CRODAFOS™ N-3A) or dextran 500k. Other suitable examples of the anti-kogation agents include CRODAFOS™ HCE (phosphate-ester from Croda Int.), CRODAFOS®010A (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

The anti-kogation agent may be present in the fusing agent in an amount ranging from about 0.1 wt % active to about 1.5 wt % active, based on the total weight of the fusing agent. In an example, the anti-kogation agent is present in an amount of about 0.5 wt % active, based on the total weight of the fusing agent.

Chelating agents (or sequestering agents) may be included in the aqueous liquid vehicle of the fusing agent to eliminate the deleterious effects of heavy metal impurities. In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt (Na3MGDA) is commercially available as TRILON® M from BASF Corp. 4,5-dihydroxy-1, 3-benzenedisulfonic acid disodium salt monohydrate is commercially available as TIRON™ monohydrate. Hexamethylenediamine tetra(methylene phosphonic acid), potassium salt is commercially available as DEQUEST®2054 from Italmatch Chemicals.

Whether a single chelating agent is used or a combination of chelating agents is used, the total amount of chelating agent(s) in the fusing agent may range from greater than 0 wt % active to about 0.5 wt % active based on the total weight of the fusing agent. In an example, the chelating agent is present in an amount ranging from about 0.05 wt % active to about 0.2 wt % active based on the total weight of fusing agent. In another example, the chelating agent(s) is/are present in the fusing agent in an amount of about 0.05 wt % active (based on the total weight of the fusing agent).

The FA vehicle may also include humectant(s). An example of a suitable humectant is ethoxylated glycerin having the following formula:

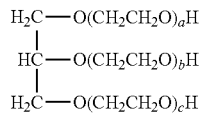

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

The balance of the fusing agent(s) is water (e.g., deionized water, purified water, etc.), which as described herein, may vary depending upon the other components in the fusing agent(s).

Detailing Agent

Some examples of the multi-fluid kit and/or 3D printing kit include a detailing agent. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed herein in reference to the antioxidant formulation. The total amount of surfactant(s) in the detailing agent may range from about 0.10 wt % to about 5 wt % with respect to the total weight of the detailing agent.

The co-solvent(s) that may be used in the detailing agent include any of the co-solvents listed above in reference to the antioxidant formulation. The total amount of co-solvent(s) in the detailing agent may range from about 1 wt % to about 65 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

It may be desirable to add color to the detailing agent when the detailing agent is applied to the edge of a colored part. Color in the detailing agent may be desirable when used at a part edge because some of the colorant may become embedded in the polymeric build material that fuses/coalesces at the edge. As such, in some examples, the dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

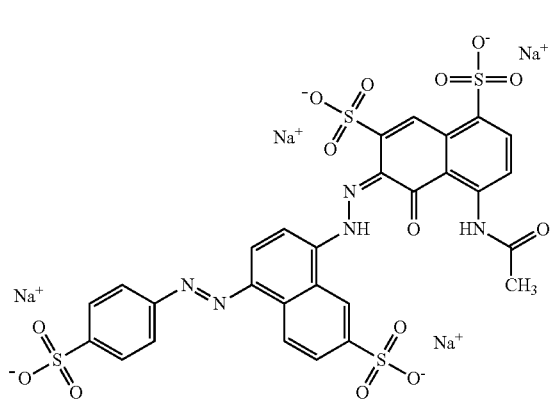 [SMILES: [Na+] ; CC(=O)Nc1ccc(S(=O)(=O)[O-])c2c1C(=O)/C(=N\Nc1ccc(/N=N/c3ccc(S(=O)(=O)[O-])cc3)c3ccc(S(=O)(=O)[O-])cc13)C(S(=O)(=O)[O-])=C2 ; [Na+] ; [Na+] ; [Na+]]

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

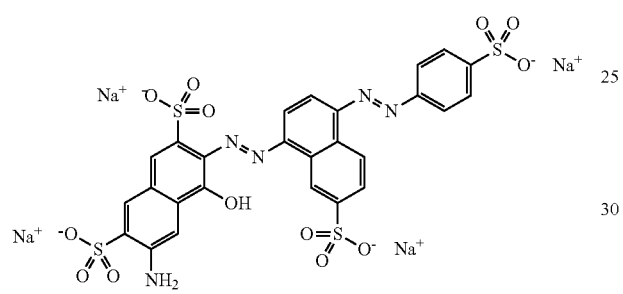

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

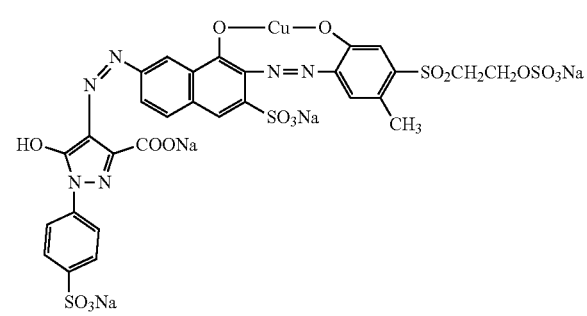

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

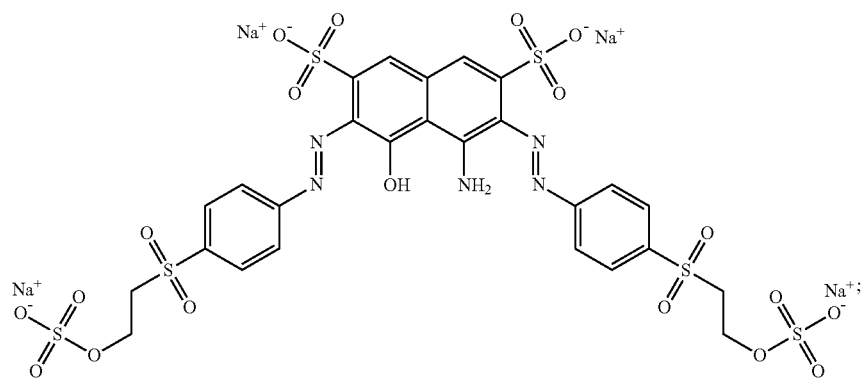 [SMILES: [Na+] ; Nc1c(/N=N/c2ccc(S(=O)(=O)CCOS(=O)(=O)O)cc2)c(S(=O)(=O)O)cc2cc(S(=O)(=O)O)c(/N=N/c3ccc(S(=O)(=O)CCOS(=O)(=O)O)cc3)c(O)c12 ; [Na+] ; [Na+] ; [Na+]]

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl]amino]phenyl]-(2-sulfophenyl) ethylidene]-1-cyclohexa-2,5-dienylidene]-[(3-sulfophenyl) methyl]azanium with a chemical structure of:

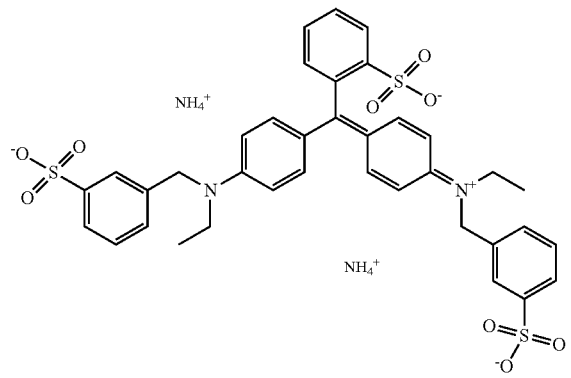

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1, 3-disulfonate with a chemical structure of:

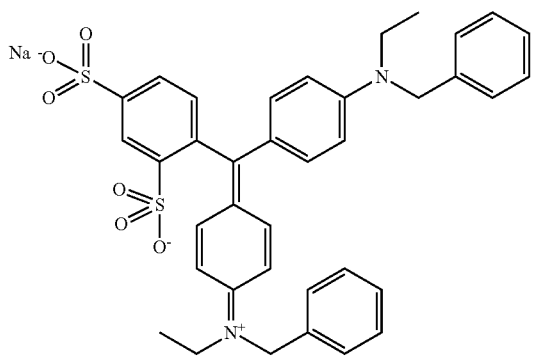

(commercially available as Acid Blue 7); and a phthalocyanine with a chemical structure of:

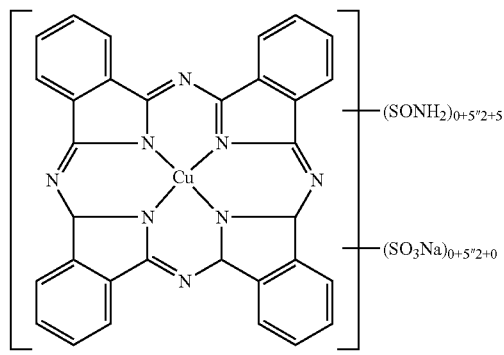

(commercially available as Direct Blue 199); and combinations thereof.

In an example of the detailing agent, the dye may be present in an amount ranging from about 1 wt % to about 3 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Coloring Agent

Some examples of the multi-fluid kit and/or 3D printing kit include a coloring agent. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described herein in reference to the antioxidant formulation and/or fusing agents).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the build material composition in contact therewith when the build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Build Material Composition

The build material composition includes a polymeric build material. Examples of suitable polymeric materials include a polyamide (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), and a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric build material may be made up of similarly sized particles and/or differently sized particles. In an example, the average particle size of the polymeric build material ranges from about 2 μm to about 225 μm. In another example, the average particle size of the polymeric build material ranges from about 10 μm to about 130 μm. As noted above, the term "average particle size", as used herein, may refer to a number-weighted mean diameter or a volume-weighted mean diameter of a particle distribution.

When the polymeric build material is a polyamide, the polymer may have a wide processing window of greater than 5° C., which can be defined by the temperature range between the melting point and the re-crystallization temperature. In an example, the polymer may have a melting point ranging from about 50° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C.

When the polymeric build material is a thermoplastic elastomer, the thermoplastic elastomer may have a melting range within the range of from about 130° C. to about 250° C. In some examples (e.g., when the thermoplastic elastomer is a polyether block amide), the thermoplastic elastomer may have a melting range of from about 130° C. to about 175° C. In some other examples (e.g., when the thermoplastic elastomer is a thermoplastic polyurethane), the thermoplastic elastomer may have a melting range of from about 130° C. to about 180° C. or a melting range of from about 175° C. to about 210° C.

In some examples, the polymeric build material does not substantially absorb radiation having a wavelength within the range of 300 nm to 1400 nm. The phrase "does not substantially absorb" means that the absorptivity of the polymeric build material at a particular wavelength is 25% or less (e.g., 20%, 10%, 5%, etc.)

In some examples, in addition to the polymeric build material, the build material composition may include an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to prevent or slow discoloration (e.g., yellowing) of the polymeric build material by preventing or slowing oxidation of the polymeric build material. In some examples, the polymeric material may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX®1098 (benzenepropanamide, N,N'-1,6-hexanediylbis(3,5-bis(1,1-dimethylethyl)-4-hydroxy)), IRGANOX®254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymeric build material 16. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 µm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods and Methods of Use

Different examples of the 3D printing method are shown and described in reference to FIG. 1 through FIG. 7.

Prior to execution of any examples of the method, it is to be understood that a controller may access data stored in a data store pertaining to a 3D part/object that is to be printed. For example, the controller may determine the number of layers of the build material composition that are to be formed, the locations at which any of the agents is/are to be deposited on each of the respective layers, etc.

Printing with the Antioxidant Formulation and one Fusing Agent

Figure 2:
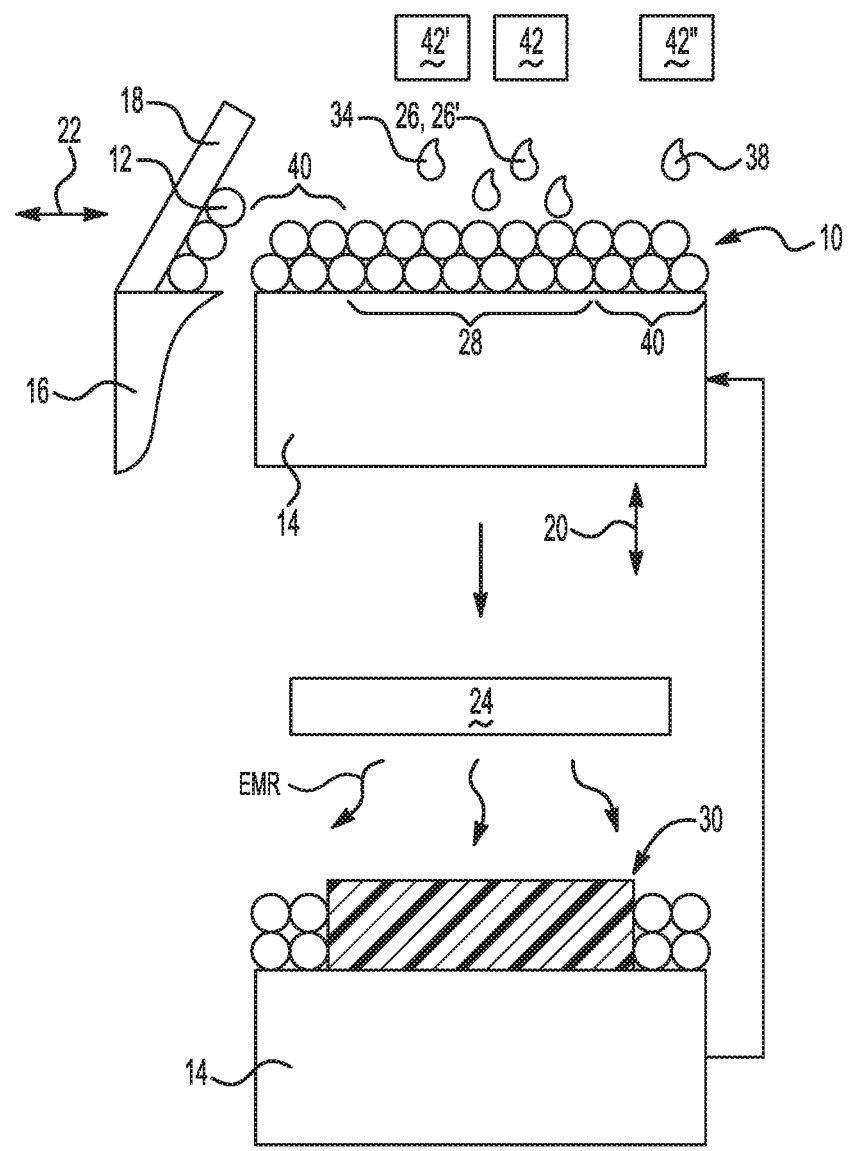
FIG. 2 is a schematic illustration of one example of the 3D printing method of FIG. 1.

Referring now to FIG. 1 and FIG. 2, an example of the method 100 which utilizes the antioxidant formulation and one of the fusing agents is depicted.

The method 100 shown in FIG. 1 includes applying a polymeric build material composition to form a build material layer (reference numeral 102); based on a 3D object model, selectively applying a fusing agent on at least a portion of the build material layer (reference numeral 104); based on the 3D object model, selectively applying an antioxidant formulation on the at least the portion of the build material layer, wherein the antioxidant formulation includes water and an antioxidant blend consisting of a primary antioxidant and a secondary antioxidant; (reference numeral 106); and exposing the build material layer to electromagnetic radiation to coalesce the at least the portion to form a layer of a 3D object (reference numeral 108).

The method 100 is shown schematically in FIG. 2. In FIG. 2, a layer 10 of the polymeric build material composition 12 is applied on a build area platform 14. A printing system may be used to apply the polymeric build material composition 12. The printing system may include the build area platform 14, a build material supply 16 containing the build material composition 12, and a build material distributor 18.

The build area platform 14 receives the polymeric build material composition 12 from the build material supply 16. The build area platform 14 may be moved in the directions as denoted by the arrow 20, e.g., along the z-axis, so that the polymeric build material composition 12 may be delivered to the build area platform 14 or to a previously formed layer. In an example, when the polymeric build material composition 12 is to be delivered, the build area platform 14 may be programmed to advance (e.g., downward) enough so that the build material distributor 18 can push the polymeric build material composition 12 onto the build area platform 14 to form a substantially uniform layer 10 of the build material composition 12 thereon. The build area platform 14 may also be returned to its original position, for example, when a new part is to be built.

The build material supply 16 may be a container, bed, or other surface that is to position the build material composition 12 between the build material distributor 18 and the build area platform 14. The build material supply 16 may include heaters so that the polymeric build material composition 12 is heated to a supply temperature ranging from about 25° C. to about 150° C. In these examples, the supply temperature may depend, in part, on the polymeric build material composition 12 used and/or the 3D printer used. As such, the range provided is one example, and higher or lower temperatures may be used.

The build material distributor 18 may be moved in the directions as denoted by the arrow 22, e.g., along the y-axis, over the build material supply 16 and across the build area platform 14 to spread the layer 10 of the polymeric build material composition 12 over the build area platform 14. The build material distributor 18 may also be returned to a position adjacent to the build material supply 16 following the spreading of the polymeric build material composition 12. The build material distributor 18 may be a blade (e.g., a doctor blade), a roller, a combination of a roller and a blade, and/or any other device capable of spreading the polymeric build material composition 12 over the build area platform 14. For instance, the build material distributor 18 may be a counter-rotating roller. In some examples, the build material supply 16 or a portion of the build material supply 16 may translate along with the build material distributor 18 such that polymeric build material composition 12 is delivered continuously to the build area platform 14 rather than being supplied from a single location at the side of the printing system as depicted in FIG. 2.

The build material supply 16 may supply the polymeric build material composition 12 into a position so that it is ready to be spread onto the build area platform 14. The build material distributor 18 may spread the supplied polymeric build material composition 12 onto the build area platform 14. The controller (not shown) may process "control build material supply" data, and in response, control the build material supply 16 to appropriately position the particles of the polymeric build material composition 12, and may process "control spreader" data, and in response, control the build material distributor 18 to spread the polymeric build material composition 12 over the build area platform 14 to form the layer 10 of the polymeric build material composition 12 thereon. In FIG. 2, one build material layer 10 has been formed.

The layer 10 has a substantially uniform thickness across the build area platform 14. In an example, the build material layer 10 has a thickness ranging from about 50 μm to about 120 μm. In another example, the thickness of the build material layer 26 ranges from about 30 μm to about 300 μm. It is to be understood that thinner or thicker layers may also be used. For example, the thickness of the build material layer 10 may range from about 20 μm to about 500 μm. The layer thickness may be about 2× (i.e., 2 times) the average diameter of the build material composition particles at a minimum for finer part definition. In some examples, the layer thickness may be about 1.2× the average diameter of the build material composition particles.

After the polymeric build material composition 12 has been applied, and prior to further processing, the build material layer 10 may be exposed to heating. In an example, the heating temperature may be below the melting point or melting range of the polymeric material of the polymeric build material composition 12. As examples, the pre-heating temperature may range from about 5° C. to about 50° C. below the melting point or the lowest temperature of the melting range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the polymeric build material composition 12 used. As such, the ranges provided are some examples, and higher or lower temperatures may be used.

Pre-heating the layer 10 may be accomplished by using any suitable heat source that exposes all of the polymeric build material composition 12 in the layer 10 to the heat. Examples of the heat source include a thermal heat source (e.g., a heater (not shown) integrated into the build area platform 14 (which may include sidewalls)) or a radiation source 24.

After the layer 10 is formed, and in some instances is pre-heated, the fusing agent(s) 26 or 26' is selectively applied on at least some of the polymeric build material composition 12 in the layer 10 to form a patterned portion 28.

To form a layer 30 of a 3D object, at least a portion (e.g., patterned portion 28) of the layer 10 of the build material composition 12 is patterned with the fusing agent 26, 26'. Either fusing agent 26 or 26' may be used. When it is desirable to form a white, colored, or slightly tinted object layer 30, the primer fusing agent 26' may be used to pattern the build material composition 12. The primer fusing agent 26' is clear or slightly tinted, and thus the resulting 3D object layer 30 may appear white or the color of the polymeric build material composition 12. When it is desirable to form a darker color or black object layer 30, the core fusing agent 26 may be used. The core fusing agent 26 is dark or black, and thus the resulting 3D object layer 30 may appear grey, black or another dark color. In other examples of the method (e.g., method 200 shown in FIG. 3 and FIG. 4) the two fusing agents 26, 26' may be used to pattern different portions of a single build material layer 10, which will be described further in reference to FIG. 3 and FIG. 4. Color may also be added by using the coloring agent (not shown), which will also be described further in reference to FIG. 6.

The volume of the fusing agent 26, 26' that is applied per unit of the polymeric build material composition 12 in the patterned portion 28 may be sufficient to absorb and convert enough electromagnetic radiation so that the polymeric build material composition 12 in the patterned portion 28 will coalesce/fuse. The volume of the fusing agent 26, 26' that is applied per unit of the polymeric build material composition 12 may depend, at least in part, on the energy absorber used, the energy absorber loading in the fusing agent 26, 26', and the polymeric build material composition 12 used.

To reduce the thermal degradation of the polymeric build material composition 12, the antioxidant formulation 34 may be applied to all or some of the build material layer 10. In some instances, the antioxidant formulation 34 may be applied to the patterned portion 28. The application of the antioxidant formulation 34 in this portion 28 helps to reduce the thermal degradation, and thus improve the quality, of the 3D object layer 30.

The antioxidant formulation 34 can provide a cooling effect, and thus the ratio of antioxidant formulation 34 to fusing agent 26 or 26' in the patterned portion 28 is controlled in order to achieve both fusing and a desired level of antioxidation. In an example, a weight ratio of the antioxidant blend in the selectively applied antioxidant formulation 34 to an energy absorber in the selectively applied fusing agent 26, 26' ranges from about 0.1 to about 5. In another example, the weight of the antioxidant blend applied to the portion 28 ranges from about 1.5 times to about 2.25 times more than the weight of the energy absorber applied to the portion 28. Depending upon the 3D printer, the print mode may also be adjusted to counteract any cooling effect.

The antioxidant formulation 34 may also be applied to the non-patterned portion 40 (that does not have fusing agent 26 or 26' applied thereto). As such, some examples of the method 100 further include selectively applying the antioxidant formulation 34 on another portion 40 of the build material layer 10 without the fusing agent 26 or 26' thereon. The application of the antioxidant formulation 34 in this portion 40 helps to reduce the thermal degradation of the polymeric build material composition 12. This may improve the recyclability/reusability of the polymeric build material composition 12.

As mentioned, the portion(s) 40 are not patterned with the fusing agent 26, 26' and thus are not to become part of the final 3D object layer 30. However, thermal energy generated during radiation exposure may propagate into the surrounding portion(s) 40 that do not have the fusing agent 26, 26' applied thereto. When the antioxidant formulation 34 is applied in the non-patterned portion(s) 40, it may help to inhibit the propagation of thermal energy into the non-patterned portion(s) 40. Alternatively, when the antioxidant formulation 34 is applied in the patterned portion 28 but not in the non-patterned portion(s) 40, a detailing agent 38 may be selectively applied to the portion(s) 40 of the layer 10. The detailing agent 38 also inhibits the propagation of thermal energy, and thus helps to prevent the coalescence of the non-patterned build material portion(s) 40.

After the agents/formulations 26 or 26', 34, and, in some instances 38 are selectively applied in the specific portion(s) 28, or 28, 40 of the layer 10, the entire layer 10 of the build material composition 12 is exposed to electromagnetic radiation (shown as EMR in FIG. 2).

The electromagnetic radiation is emitted from the radiation source 24. The length of time the electromagnetic radiation is applied for, or energy exposure time, may be dependent, for example, on one or more of: characteristics of the radiation source 24; characteristics of the build material composition 12; and/or characteristics of the fusing agent 26, 26'.

It is to be understood that the electromagnetic radiation exposure may be accomplished in a single radiation event or in multiple radiation events. In an example, the exposing of the build material composition 12 is accomplished in multiple radiation events. In a specific example, the number of radiation events ranges from 3 to 8. In still another specific example, the exposure of the build material composition 12 to electromagnetic radiation may be accomplished in 3 radiation events. It may be desirable to expose the build material composition 12 to electromagnetic radiation in multiple radiation events to counteract a cooling effect that may be brought on by the amount of the agents 26 or 26', 34, and in some instances 38 that is applied to the build material layer 10. Additionally, it may be desirable to expose the polymeric build material composition 12 to electromagnetic radiation in multiple radiation events to sufficiently elevate the temperature of the polymeric build material composition 12 in the patterned portion(s) 28, without over heating the build material composition 12 in the non-patterned portion(s) 40.

The fusing agent 26 or 26' enhances the absorption of the radiation, converts the absorbed radiation to thermal energy, and promotes the transfer of the thermal heat to the polymeric build material composition 12 in contact therewith. In an example, the fusing agent 26, 26' sufficiently elevates the temperature of the polymeric build material composition 12 in the portion 28 to a temperature above the melting point or within the melting range of the polymeric material, allowing coalescing/fusing (e.g., thermal merging, melting, binding, etc.) of the polymeric build material composition 12 to take place. The application of the electromagnetic radiation forms the 3D object layer 30, which may have improved quality (e.g., compared to 3D object layers formed without the antioxidant formulation).

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 26, 26' and may heat the polymeric build material composition 12 in contact therewith, and may not be substantially absorbed (e.g., 25% or less of the applied radiation is absorbed) by the non-patterned polymeric build material composition 12 in portion(s) 40.

After the 3D object layer 30 is formed, additional layer(s) may be formed thereon to create an example of the 3D object. To form the next layer, additional polymeric build material composition 12 may be applied on the layer 30. The fusing agent 26 or 26' is then selectively applied on at least a portion of the additional build material composition 12, according to the 3D object model. The antioxidant formulation 34 is also selectively applied on the patterned portion 28, and, in some instances, on the non-patterned portion 40. The detailing agent 38 may be applied in any area of the additional build material composition 12 where coalescence is not desirable. After the agent(s)/formulation(s) 26 or 26', 34, and in some instances 38 is/are applied, the entire layer of the additional polymeric build material composition 12 is exposed to electromagnetic radiation in the manner described herein. The application of additional polymeric build material composition 12, the selective application of the agent(s) 26 or 26', 34, and in some instances 38, and the electromagnetic radiation exposure may be repeated a predetermined number of cycles to form the final 3D object 30 in accordance with the 3D object model.

Printing with the Antioxidant Formulation and Both Fusing Agents

Figure 3:
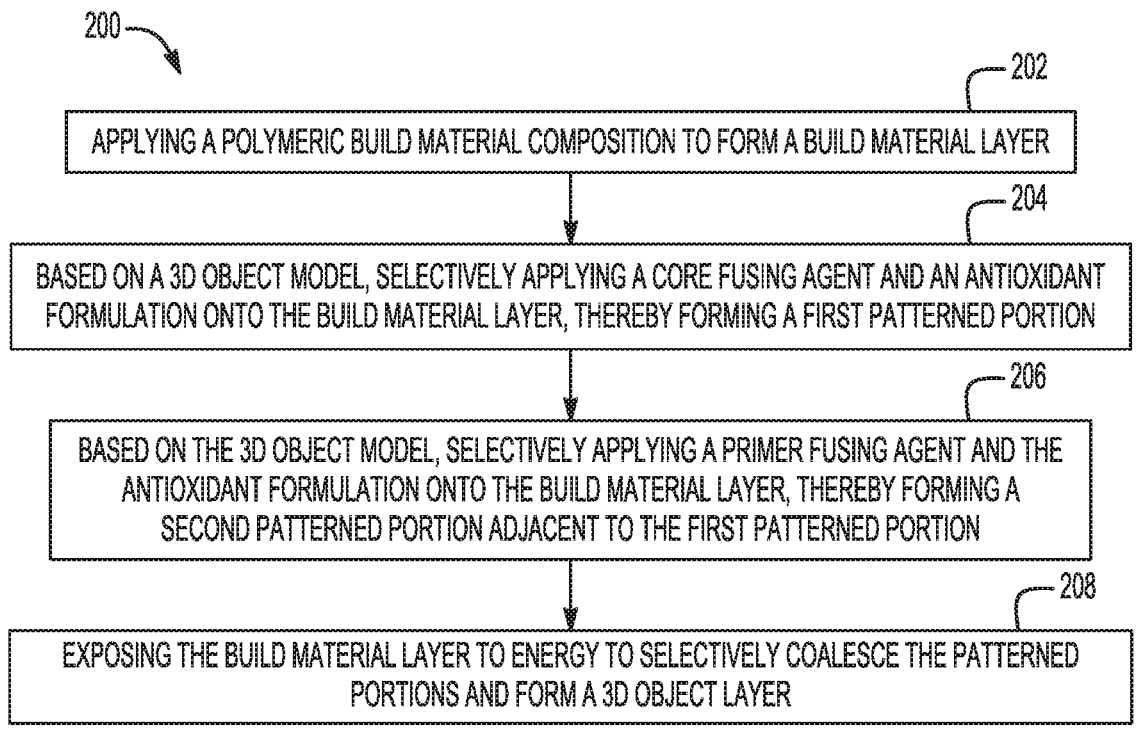
FIG. 3 is a flow diagram depicting another example of a 3D printing method.

Referring now to FIG. 3, an example of the method 200 which utilizes the antioxidant formulation 34 and both of the fusing agents 26 and 26' is depicted.

The method 200 shown in FIG. 3 includes applying a polymeric build material composition to form a build material layer (reference numeral 202); based on a 3D object model, selectively applying a core fusing agent and an antioxidant formulation onto the build material layer, thereby forming a first patterned portion (reference numeral 204); based on the 3D object model, selectively applying a primer fusing agent and the antioxidant formulation onto the build material layer, thereby forming a second patterned portion adjacent to the first patterned portion (reference numeral 206); and exposing the build material layer 10 to energy to selectively coalesce the patterned portions and form a 3D object layer (reference numeral 208).

Figure 4:
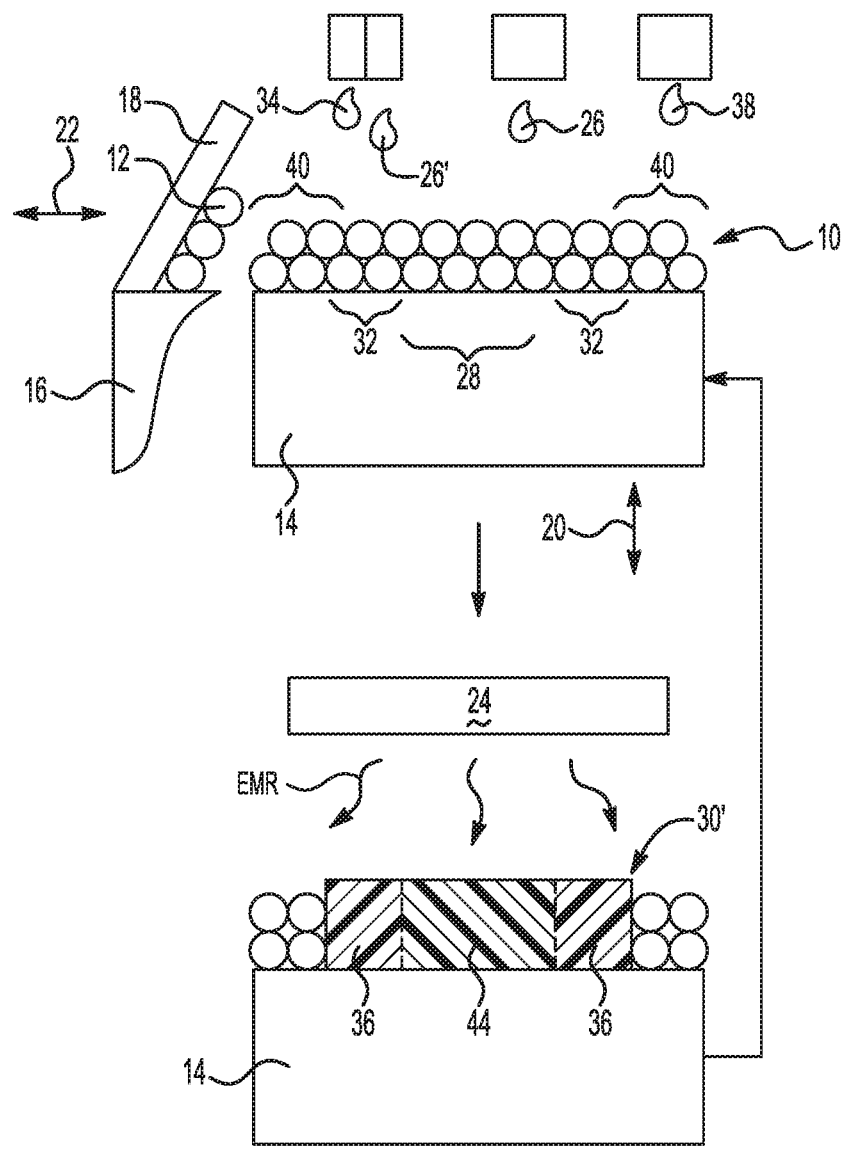
FIG. 4 is a schematic illustration of one example of the 3D printing method of FIG. 3.

The method 200 is shown schematically in FIG. 4. In FIG. 4, one layer 10 of the polymeric build material composition 12 is applied on the build area platform 14 as described in reference to FIG. 2. After the polymeric build material composition 12 has been applied, and prior to further processing, the build material layer 10 may be exposed to pre-heating as described in reference to FIG. 2.

In this example of the method 200, the core fusing agent(s) 26 and the antioxidant formulation 34 are selectively applied on at least some of the polymeric build material composition 12 in the layer 10 to form a first patterned portion 28; and the primer fusing agent(s) 26' and the antioxidant formulation 34 are selectively applied on at least some of the polymeric build material composition 12 in the layer 10 to form second patterned portion(s) 32 that are adjacent to the first patterned portion 28. The first patterned portion 28 is generally located at an interior portion of the build material layer 10 and the second patterned portion 32 is generally located at an exterior portion of the build material layer 10 where it is desirable to impart a white appearance or other color at one or more surface(s) of the 3D printed object layer 30'.

The volume of the core fusing agent 26 that is applied per unit of the polymeric build material composition 12 in the first patterned portion 28 may be sufficient to absorb and convert enough electromagnetic radiation so that the build material composition 12 in the patterned portion 28 will coalesce/fuse.

The volume of the primer fusing agent 26' that is applied per unit of the polymeric build material composition 12 in the second patterned portion 32 may be sufficient to absorb and convert enough electromagnetic radiation so that the build material composition 12 in the second patterned portion 32 will coalesce/fuse.

The volume of the antioxidant formulation 34 that is applied per unit of the polymeric build material composition 12 in the first and second patterned portions 28, 32 may depend upon the voxel volume and the volume of the fusing agent 26, 26' that is applied. The weight ratio of the antioxidant blend to the respective energy absorbers may be controlled in order to achieve both coalescence and antioxidation.

In the example shown in FIG. 4, the detailing agent 38 is also selectively applied to the portion(s) 40 of the layer 10. The portion(s) 40 are not patterned with the fusing agent 26, 26' and thus are not to become part of the final 3D object layer 30'. In other examples, the antioxidant formulation 34 may be applied to the portion(s) 40 instead of the detailing agent 38. In some examples, the detailing agent 38 may also be applied to the portion(s) 28 that are patterned with the fusing agent 26, 26' and the antioxidant formulation 34. In these examples, the detailing agent 38 may be used to adjust the level of fusing in particular areas, to keep the patterned portion(s) 28 from overheating, etc.

After the agents 26, 26', 34, and in some instances 38 are selectively applied in the specific portion(s) 28, 32, and 40 of the layer 10, the entire layer 10 of the build material composition 12 is exposed to electromagnetic radiation (shown as EMR in FIG. 4). Radiation exposure may be accomplished as described in reference to FIG. 2.

In this example, the respective fusing agents 26 and 26' enhance the absorption of the radiation, convert the absorbed radiation to thermal energy, and promote the transfer of the thermal heat to the build material composition 12 in contact therewith. In an example, the fusing agents 26, 26' sufficiently elevate the temperature of the polymeric build material composition 12 in the respective portions 28, 32 to a temperature above the melting point or within the melting range of the polymeric material, allowing coalescing/fusing (e.g., thermal merging, melting, binding, etc.) of the polymeric build material composition 12 to take place. The application of the electromagnetic radiation forms the 3D object layer 30', which, in this example, includes a core portion 44 and outer portions 36 at opposed ends of the core portion 44. The entire 3D object layer 30' may have improved part quality due to the antioxidant formulation 34.

FIG. 4 illustrates one example of how the core fusing agent 26, the primer fusing agent 26' and the antioxidant formulation 34 may be used together to pattern a single build material layer 10.

When both fusing agents 26 and 26' are used to build up a 3D object, it may be desirable to utilize the core fusing agent 26 to form the core (e.g., the center or inner-most portion) of the 3D object, and it may be desirable to utilize the primer fusing agent 26' to form the outermost layers of the 3D object. The core fusing agent 26 can impart strength to the core of the 3D object, while the primer fusing agent 26' enables white or a color to be exhibited at the exterior of the 3D object. It is to be understood that the antioxidant formulation 34 may also be used to prevent thermal degradation of the polymeric build material composition 12 throughout the 3D printing process.

Figure 5:
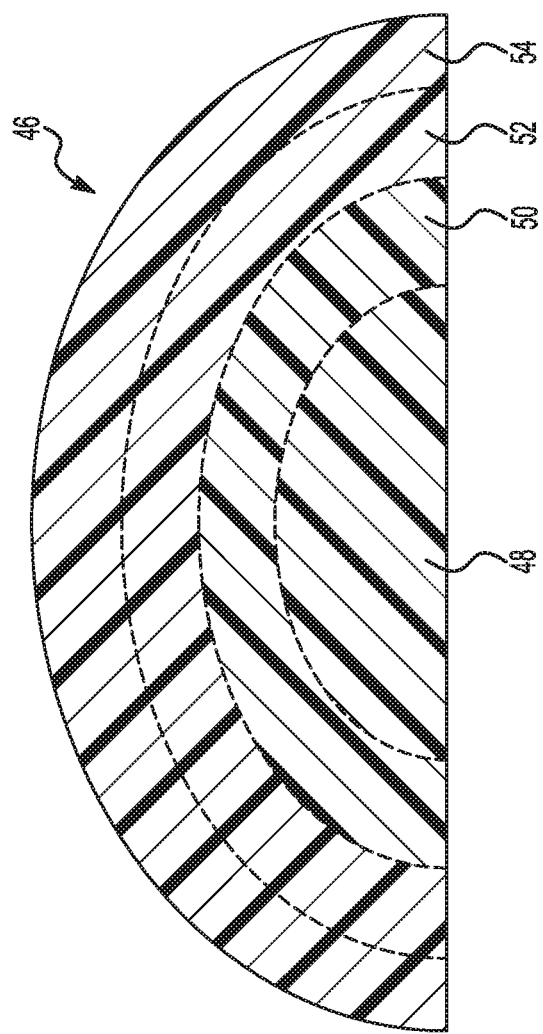
FIG. 5 is a cross-sectional view of an example 3D object.

An example of a 3D object 46 formed with the primer fusing agent 26', the core fusing agent 26, and the antioxidant formulation 34 is shown in FIG. 5. To form this example of the 3D object 46, the core fusing agent 26 and the antioxidant formulation 34 would be applied on multiple layers of the build material composition 12 to pattern and ultimately form the inner portions 48 and 50 of the 3D printed object 46, and the primer fusing agent 26' and the antioxidant formulation 34 would be applied on multiple layers of the build material composition 12 to pattern and ultimately form the outermost portions 52 and 54 of the 3D printed object 46. After each build material layer 10 is patterned with the agent(s) 26, 34 or 26', 34, electromagnetic radiation may be applied to solidify the respective patterned build material layers.

Figure 6:
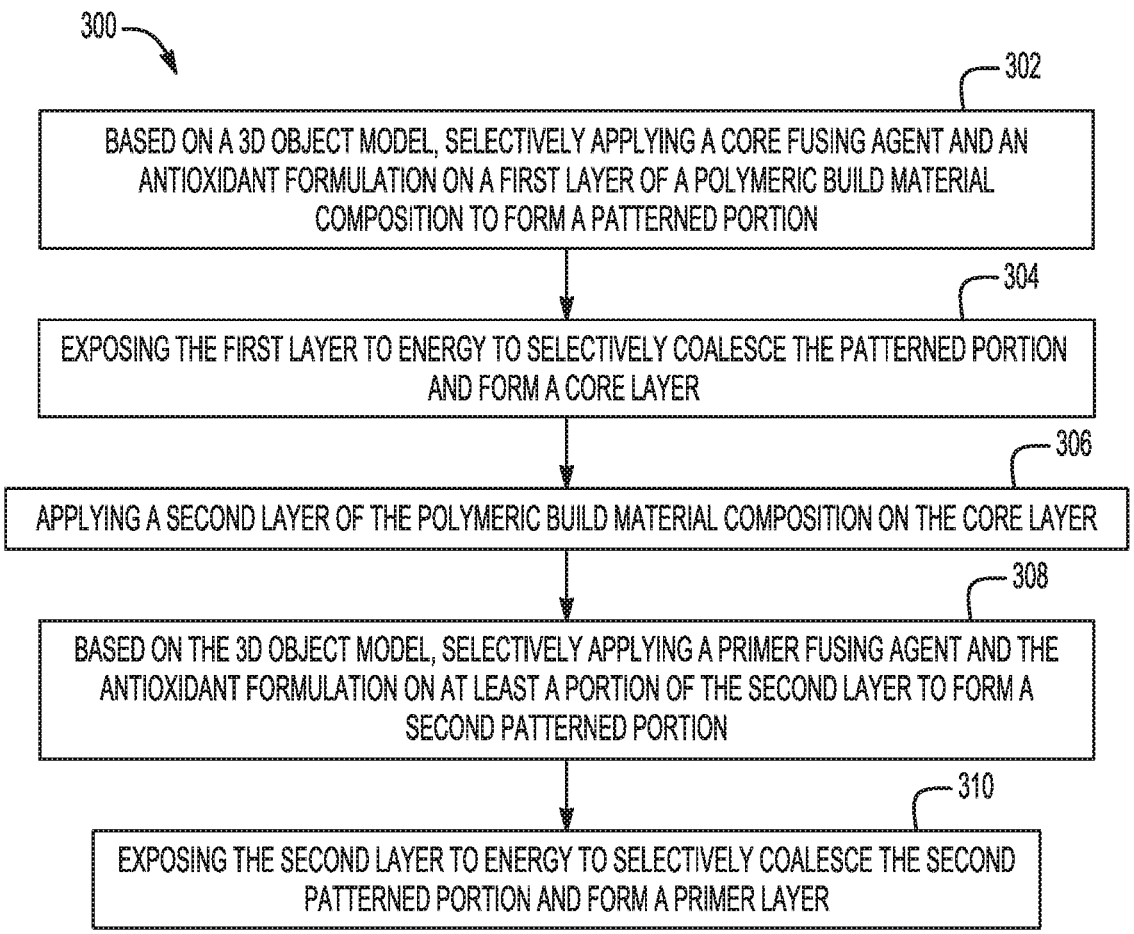
FIG. 6 is a flow diagram depicting another example of a 3D printing method.
Figure 7:
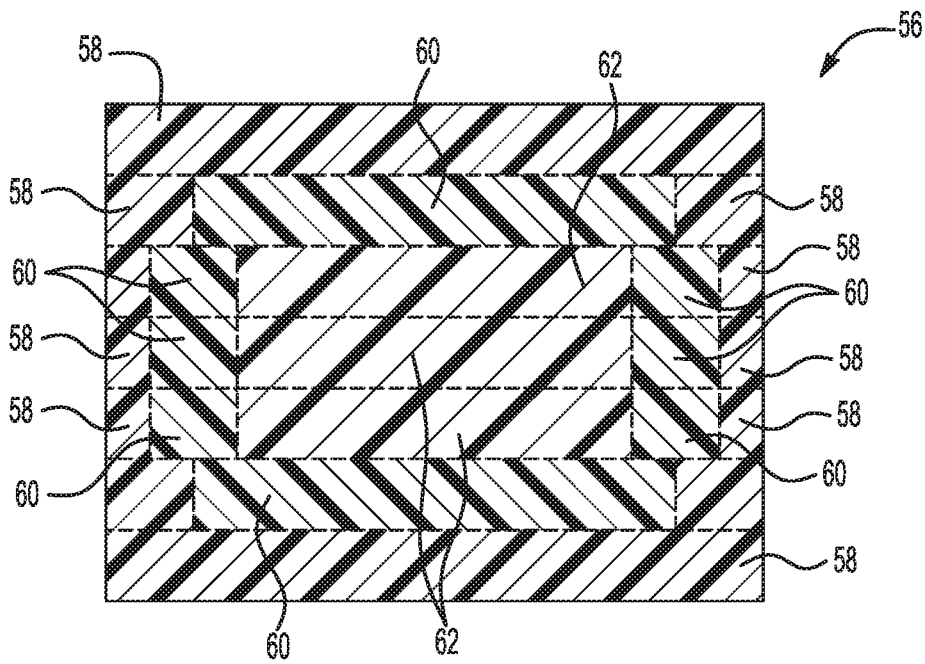
FIG. 7 is a cross-sectional view of another example 3D object.

Another example of the method 300 using each of these agents 26, 26', 34 is shown in FIG. 6, and an example of the resulting 3D object 56 is shown in FIG. 7.

The method 300 includes based on a 3D object model, selectively applying a core fusing agent and an antioxidant formulation on a first layer of polymeric build material composition to form a patterned portion (reference numeral 302); exposing the first layer to energy to selectively coalesce the patterned portion and form a core layer (reference numeral 304); applying a second layer of the polymeric build material composition on the core layer (reference numeral 306); based on the 3D object model, selectively applying a primer fusing agent and the antioxidant formulation on at least a portion of the second layer to form a second patterned portion (reference numeral 308); and exposing the second layer to energy to selectively coalesce the second patterned portion and form a 3D object layer (in this example, a primer layer) (reference numeral 310). Some examples of the method 300 further includes selectively applying the primer fusing agent 26' and the antioxidant formulation 34 on the first layer at an area adjacent to the patterned portion 28, whereby the area coalesces to form an edge portion adjacent to the core layer.

An example of the 3D object 56 formed using the method 300 is shown FIG. 7. To form this example of the 3D object 56, the outermost build material layer(s) and the outermost edges of the middle build material layers would be patterned with the primer fusing agent 26' and the antioxidant formulation 34 to form 3D object layers 58, 60. In the example shown in FIG. 7, the innermost portions of the middle build material layers would be patterned with the core fusing agent 26 and the antioxidant formulation 34 to form the core portions 62 of the object 56.

In this example of the method 300, any number of core layers 62 may be formed, and any number of 3D object layers 58, 60 may be formed.

In one example of the method 300, a predetermined number of 3D object layers (i.e., core layers 62) are formed by iteratively applying the polymeric build material composition 12 to form respective build material layers 10; selectively applying the core fusing agent 26 and the antioxidant formulation 34 on the respective build material layers 10 to form respective patterned portions 28; and exposing the respective build material layers to energy. In some examples, the predetermined number of 3D object layers (i.e., core layers 62) is formed on top of a predetermined number of 3D object layers (i.e., primer layers 58, 60). In these examples, the method 300 may also include forming a second predetermined number of 3D object layers (i.e., primer layers 58, 60) on the predetermined number of 3D object layers (i.e., core layers 62) by iteratively applying the polymeric build material composition 12 to form additional individual build material layers 10; selectively applying the primer fusing agent 26' and the antioxidant formulation 34 on the additional individual build material layers 10 to form additional individual patterned portions 32; and exposing the additional individual build material layers to energy.

In the example shown in FIG. 7, the coloring agent may also be applied with the primer fusing agent 26' and the antioxidant formulation 34 to generate color at the exterior surfaces of the object 56. For example, the coloring agent may be applied with the primer fusing agent 26' and the antioxidant formulation 34 on the build material that forms the 3D object layers 58. Since the primer fusing agent 26' and the and the antioxidant formulation 34 are clear or slightly tinted and the polymeric build material composition 12 is white or off-white, the color of the coloring agent will be the color of the resulting 3D object layers 58. The colorant of the coloring agent becomes embedded throughout the coalesced/fused build material composition of the 3D object layers 58. In this example, the 3D object layers 60 (which are white or slightly tinted) may or may not have the coloring agent applied thereto. These intermediate layers 60 may help to form a mask over the black (or dark colored) core layers 62 because they optically isolate the core layers 62.

While several variations of the objects 46, 56 and the combinations of fusing agents 26, 26' have been described, it is to be understood that the fusing agents 26, 26' and the antioxidant formulation 34 may be used to form any desirable 3D object.

In any of the examples of the method 100, 200, 300 disclosed herein, any of the agents (fusing agent 26, 26', antioxidant formulation 34, detailing agent 38 and/or coloring agent) may be dispensed from an applicator 42, 42', 42" (shown in FIG. 2 and FIG. 4). The applicator(s) 42, 42', 42" may each be a thermal inkjet printhead, a piezoelectric printhead, a continuous inkjet printhead, etc., and the selective application of the fusing agent 26, 26', antioxidant formulation 34, detailing agent 38 and/or coloring agent may be accomplished by thermal inkjet printing, piezo electric inkjet printing, continuous inkjet printing, etc. The controller may process data, and in response, control the applicator(s) 42, 42', 42" to deposit the fusing agent 26, 26', antioxidant formulation 34, detailing agent 38 and/or coloring agent onto predetermined portion(s) of the polymeric build material composition 12. It is to be understood that the applicators 42, 42', 42" may be separate applicators or a single applicator with several individual cartridges for dispensing the respective agents.

It is to be understood that the selective application of any of the fusing agent 26, 26', antioxidant formulation 34, detailing agent 38 and/or coloring agent may be accomplished in a single printing pass or in multiple printing passes. In some examples, the agent(s)/formulation(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 26, 26', antioxidant formulation 34, detailing agent 38 and/or coloring agent in multiple printing passes to increase the amount, e.g., of the energy absorber, antioxidant blend, colorant, etc. that is applied to the polymeric build material composition 12, to avoid liquid splashing, to avoid displacement of the build material composition 12, etc.

To further illustrate the present disclosure, an example is given herein. It is to be understood that this example is provided for illustrative purposes and is not to be construed as limiting the scope of the present disclosure.

EXAMPLE

An example of the antioxidant formulation described herein was prepared and tested to evaluate its effect on a polyamide build material.

Prior to forming the antioxidant formulation, several antioxidant dispersions were prepared first. Two example antioxidant dispersions were prepared with the same primary antioxidant (namely IGRANOX®245) and secondary antioxidant (namely dilauryl ester 3,3'-thiodipropionic acid). The first antioxidant dispersion (referred to as the "first AO dispersion") included a dispersant (namely JONCRYL®683), and the second antioxidant dispersion (referred to as the "second AO dispersion") included a dispersant (namely JONCRYL®683) and a surfactant combination (namely a stearyl alcohol and sodium stearate mixture). A control antioxidant dispersion (referred to herein as the "control AO dispersion") was also prepared with the same primary and secondary antioxidants, but with no dispersant or surfactant. The formulation of each of the dispersions is shown in Table 1. The following abbreviations are used in Table 1: DLTDP for dilauryl ester 3,3'-thiodipropionic acid, KOH for potassium hydroxide, and DI $H_2O$ for deionized water.

TABLE 1

| AO Dispersions | | | |
| --- | --- | --- | --- |
| AO Dispersion ID | Components | % Active in Raw Material | Wt % in Dispersion |
| Control AO Dispersion | IGRANOX ® 245 | 100 | 2 |
|  | DLTDP | 100 | 4 |
|  | KOH | 50 | 0.15 |
|  | DI $H_2O$ | 100 | Balance |
| First AO Dispersion | IGRANOX ® 245 | 100 | 2 |
|  | DLTDP | 100 | 4 |
|  | JONCRYL ® 683 | 100 | 0.9 |
|  | KOH | 50 | 0.15 |
|  | DI $H_2O$ | 100 | Balance |
| Second AO Dispersion | IGRANOX ® 245 | 100 | 2 |
|  | DLTDP | 100 | 4 |
|  | JONCRYL ® 683 | 100 | 0.9 |
|  | Stearyl alcohol and Sodium stearate Mixture | 100 | 0.15 |
|  | KOH | 50 | 0.15 |
|  | DI $H_2O$ | 100 | Balance |

To generate the control AO dispersion, the primary and secondary antioxidants were first melted at a temperature ranging from about 100° C. to about 120° C. with constant stirring. Once melted, the temperature was reduced to about 75° C. and stirring was continued. While stirring, the KOH solution was added and DI $H_2O$ was added dropwise. This formed a highly viscous, yet stirrable paste. Additional $H_2O$ was added and the mixture was allowed to cool to room temperature.

To generate the first AO dispersion, the primary and secondary antioxidants and the dispersant were first melted at a temperature ranging from about 100° C. to about 120° C. Once melted, the temperature was reduced to about 75° C. and stirring was continued. While stirring, the KOH solution was added and DI $H_2O$ was added dropwise. This formed a highly viscous, yet stirrable paste. Additional $H_2O$ was added and the mixture was allowed to cool to room temperature.

To generate the second AO dispersion, the primary and secondary antioxidants, the dispersant, and the surfactant combination were first melted at a temperature ranging from about 100° C. to about 120° C. Once melted, the temperature was reduced to about 75° C. and stirring was continued. While stirring, the KOH solution was added and DI $H_2O$ was added dropwise. This formed a highly viscous, yet stirrable paste. Additional $H_2O$ was added and the mixture was allowed to cool to room temperature.

Each antioxidant dispersion was then placed in a ball mill for 48 hours, to reduce the particle size.

After ball milling, particle size measurements were taken of each antioxidant dispersion using a Microtrac particle size analyzer. Each antioxidant dispersion was also visually analyzed.

The particle size measurements of the first and second AO dispersions compared to the particle size measurements of the control dispersion indicated that a more uniform particle size distribution with a higher concentration of sub-micron particles can be achieved when a dispersant or a dispersant and surfactant are used. The visual results clearly showed that the first AO dispersion and the second AO dispersion were homogeneously dispersed. In contrast, the control AO dispersion was not dispersed, and the solids had clearly settled at the bottom of the container.

The first AO dispersion was then used to generate the example antioxidant formulation. The example antioxidant formulation included the first AO dispersion and a liquid vehicle (co-solvent, surfactant, DI H$_2$O). The formulation of the example antioxidant formulation is shown in Table 2.

TABLE 2

Example AO Formulation

| Components | % Active | Wt % in Formulation |
|---|---|---|
| AO Dispersion | | |
| First AO Dispersion | 6 | 2-3 |
| Liquid Vehicle | | |
| Organic Co-Solvent (propylene glycol) | 99 | 10 |
| Surfactant (TERGITOL ® 15-S-12) | 100 | 0.9 |
| DI H$_2$O | 100 | Balance |

The example AO formulation was then printed with a thermal inkjet printer to determine the printability and decap performance. A magenta dye was included in example AO formulation to enhance the visibility of the print. The print results indicated very good decap performance and nozzle health. Thus, the example AO formulation agent exhibited acceptable printing performance.

The example AO formulation was then tested to determine its effect on the yellowing and discoloration on a polyamide build material. The materials, amounts, and conditions used in the test simulated a 3D print process.

For this test, the example AO formulation was incorporated into neat polyamide-12 (PA-12) powder. More specifically, the PA-12 was dry blended with 10% (by weight) of the example AO formulation. This combination is referred to as "Example 1".

Two different comparative examples were also prepared. One comparative example was the neat polyamide-12 build material without any added AO formulation. This comparative example is referred to as "Control Example 2." Another comparative example included the neat polyamide-12 build material with 10% (by weight) of a comparative AO formulation. The comparative AO formulation included the liquid vehicle described above in Table 2, without the first AO dispersion. This comparative example is referred to as "Comp. Example 3."

All of the build material samples (Example 1, Control Example 2, Comp. Example 3) were then subjected to an aging process by placing the materials in an oven at 165° C. for 20 hours. The samples were then removed from the oven and homogenized.

Figure 8:
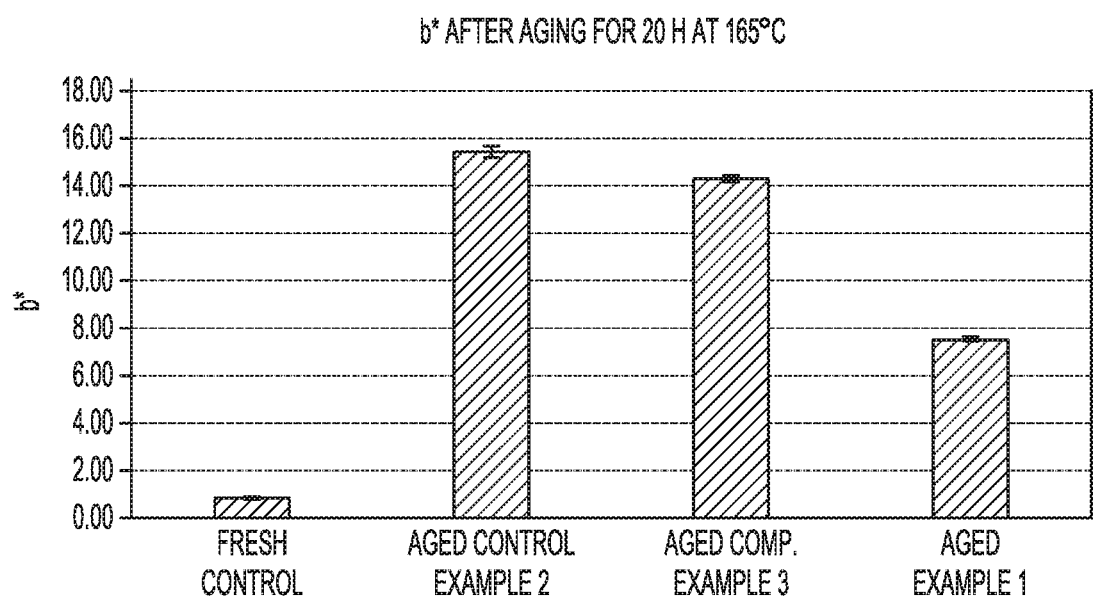
FIG. 8 is a graph depicting b* of a fresh (unaged) build material, and of one example and two comparative example build materials after exposure to an oven aging test.
Figure 9A:
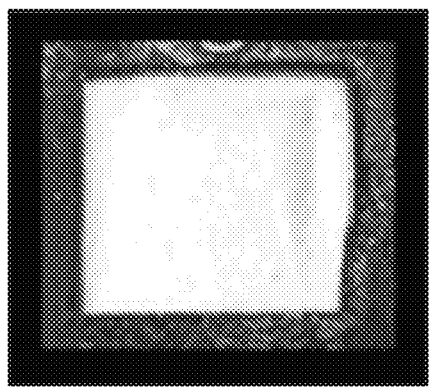
FIGS. 9A through 9D are black and white reproductions of originally colored photographs depicting the fresh (unaged) build material, and the one example and two comparative example build materials after exposure to the oven aging test.
Figure 9B:
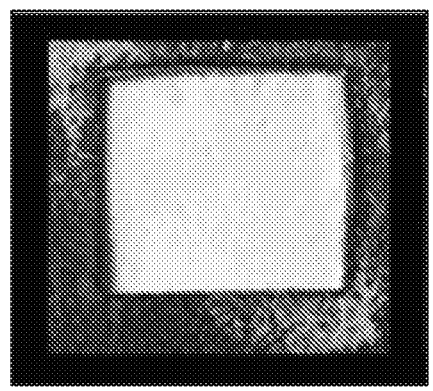
Figure 9C:
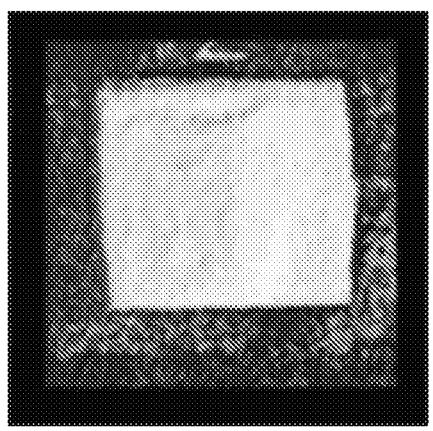
Figure 9D:
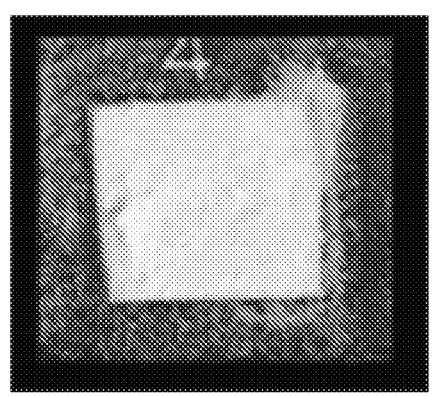

L* and b* measurements were taken for a fresh (unaged) polyamide-12 sample (Fresh Control) as well as for the aged Example 1, Control Example 2, and Comp. Example 3. The L* and b* measurements were taken using an X-rite® eXact™ spectrophotometer. L* is a measure for lightness/whiteness ranging from black (L*=0) to white (L*=100). Similarly, b* is a measure of blue to yellow, and ranges from blue (negative values) to yellow (positive values). The L* results are shown in Table 3, and the results for b* are shown in FIG. 8. Table 3 depicts three measurements, the average of the three measurements, and the standard deviation (stdev). FIG. 8 depicts the average of three measurements.

TABLE 3

L* Results

| | L* |
|---|---|
| Fresh | 95.46 |
| Control | 94.63 |
| | 93.96 |
| average | 94.68 |
| stdev | 0.75 |
| Aged | 89.71 |
| Control | 90.75 |
| Example 2 | 88.58 |
| average | 89.68 |
| stdev | 1.09 |
| Aged | 86.71 |
| Comp. | 86.26 |
| Example 3 | 86.71 |
| average | 86.56 |
| stdev | 0.26 |
| Aged | 96.82 |
| Example 3 | 96.47 |
| | 97.02 |
| average | 96.77 |
| stdev | 0.28 |

Aged Example 1 showed a significant improvement in both L* and b* values after oven aging when compared to the aged Control Example 2 and the aged Comp. Example 3. Aged Example 1 had less than a 10% change for b* (determined by a comparison with the Fresh Control), and exhibited the least amount yellowing when subjected to thermal stress, which is common in 3D printing applications.

Originally colored photographs of each of the fresh (unaged) polyamide-12 sample ("fresh Control"), the aged Control Example 2, the aged Comp. Example 3, and the aged Example 1 were taken and are shown, respectively and in black and white, in FIGS. 9A, 9B, 9C, and 9D. The visual results correlated with the L* and b* measurements. In particular, the aged Example 1 was less yellow than either the aged Control Example 2 or the aged Comp. Example 3.

It is to be understood that the ranges provided herein include the stated range and any value or sub-range within the stated range. For example, from about 0.01 wt % to about 5 wt % should be interpreted to include not only the explicitly recited limits of from about 0.01 wt % to about 5 wt %, but also to include individual values, such as about 0.25 wt %, about 0.55 wt %, about 1.74 wt %, about 2.03 wt %, about 3.2 wt %, about 4.5 wt %, etc., and sub-ranges, such as from about 0.2 wt % to about 4.8 wt %, from about 1 wt % to about 4 wt %, from about 0.5 wt % to about 3.5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A jettable antioxidant formulation for three-dimensional (3D) printing, comprising:
   an antioxidant blend consisting of a primary antioxidant and a secondary antioxidant, wherein each of the primary antioxidant and the secondary antioxidant has an average particle size ranging from about 10 nm to about 800 nm;
   a surfactant and dispersant;
   a water soluble or water miscible organic co-solvent; and
   water;
   wherein:
      the surfactant is a mixture of stearyl alcohol and sodium stearate; and
      the dispersant is selected from the group consisting of styrene acrylic copolymers, poly(vinyl alcohol), a vinyl alcohol copolymer, and combinations thereof.

2. The jettable antioxidant formulation as defined in claim 1 wherein the antioxidant blend is present in an amount ranging from about 1 wt % active to about 15 wt % active of a total weight of the jettable antioxidant formulation.

3. The jettable antioxidant formulation as defined in claim 1 wherein the primary antioxidant and the secondary antioxidant are present in a weight ratio ranging from about 1:1 to about 1:5.

4. The jettable antioxidant formulation as defined in claim 1 wherein:
   the primary antioxidant is a hindered phenol; and
   the secondary antioxidant is selected from the group consisting of a thioether, a thioester, a phosphite, and a combination thereof.

5. A multi-fluid kit for three-dimensional (3D) printing, comprising:
   a fusing agent including water and an electromagnetic radiation absorber; and
   the jettable antioxidant formulation of claim 1.

6. The multi-fluid kit as defined in claim 5 wherein:
   the primary antioxidant is a hindered phenol; and
   the secondary antioxidant is selected from the group consisting of a thioether, a thioester, a phosphite, and a combination thereof.

7. The multi-fluid kit as defined in claim 5 wherein the antioxidant blend is present in an amount ranging from about 1 wt % active to about 15 wt % active of a total weight of the antioxidant formulation.

8. The multi-fluid kit as defined in claim 5 wherein the primary antioxidant and the secondary antioxidant are present in a weight ratio ranging from about 1:1 to about 1:5.

9. The multi-fluid kit as defined in claim 5, further comprising:
   a coloring agent selected from the group consisting of a black ink, a cyan ink, a magenta ink, or a yellow ink; or
   a detailing agent including a surfactant, a co-solvent, and water; or
   both the coloring agent and the detailing agent.

10. The multi-fluid kit as defined in claim 5 wherein the fusing agent is a core fusing agent and the electromagnetic radiation absorber has absorption at least at wavelengths ranging from 400 nm to 780 nm.

11. The multi-fluid kit as defined in claim 5 wherein the fusing agent is a primer fusing agent and the electromagnetic radiation absorber is a plasmonic resonance absorber having absorption at wavelengths ranging from 800 nm to 4000 nm and having transparency at wavelengths ranging from 400 nm to 780 nm.

12. A method for three-dimensional (3D) printing, comprising:
   applying a polymeric build material composition to form a build material layer;
   based on a 3D object model, selectively applying a fusing agent on at least a portion of the build material layer;
   based on the 3D object model, selectively applying an antioxidant formulation on the at least the portion of the build material layer, wherein the antioxidant formulation includes water and an antioxidant blend consisting of a primary antioxidant and a secondary antioxidant with each of the primary antioxidant and the secondary antioxidant having an average particle size ranging from about 10 nm to about 800 nm, wherein the antioxidant formulation further includes:
      a surfactant and a dispersant;
      a water soluble or water miscible organic co-solvent; and
      water;
      wherein: the surfactant is a mixture of stearyl alcohol and sodium stearate; and the dispersant is selected from the group consisting of styrene acrylic copolymers, Poly(vinyl alcohol), a vinyl alcohol copolymer, and combinations thereof; and
   exposing the build material layer to electromagnetic radiation to coalesce the at least the portion to form a layer of a 3D object.

13. The method as defined in claim 12, further comprising selectively applying the antioxidant formulation on an other portion of the build material layer without the fusing agent thereon.

* * * * *